(12) United States Patent
Lim et al.

(10) Patent No.: US 8,693,539 B2
(45) Date of Patent: Apr. 8, 2014

(54) CODING METHOD, ERROR DETECTING METHOD, DECODING METHOD, CODING APPARATUS, ERROR DETECTING APPARATUS, AND DECODING APPARATUS

(75) Inventors: Chong Soon Lim, Singapore (SG); Takahiro Nishi, Nara (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 12/993,916

(22) PCT Filed: Mar. 26, 2010

(86) PCT No.: PCT/JP2010/002187
§ 371 (c)(1),
(2), (4) Date: Nov. 22, 2010

(87) PCT Pub. No.: WO2010/109904
PCT Pub. Date: Sep. 30, 2010

(65) Prior Publication Data
US 2011/0096835 A1 Apr. 28, 2011

(30) Foreign Application Priority Data

Mar. 26, 2009 (JP) ................................ 2009-077417

(51) Int. Cl.
*H04N 7/12* (2006.01)
*H04N 11/02* (2006.01)
(52) U.S. Cl.
USPC ................................ 375/240.12; 375/240.27
(58) Field of Classification Search
None
See application file for complete search history.

(56) References Cited

U.S. PATENT DOCUMENTS

| 2006/0028489 A1* | 2/2006 | Uyttendaele et al. ......... 345/646 |
| 2006/0132610 A1 | 6/2006 | Xin et al. |
| 2006/0146138 A1 | 7/2006 | Xin et al. |

(Continued)

FOREIGN PATENT DOCUMENTS

| JP | 2007-159111 | 6/2007 |
| JP | 2008-153907 | 7/2008 |
| JP | 2008-211417 | 9/2008 |
| WO | 2008/008133 | 1/2008 |

OTHER PUBLICATIONS

International Search Report issued May 18, 2010 in International (PCT) Application No. PCT/JP2010/002187.

(Continued)

*Primary Examiner* — Joseph Ustaris
*Assistant Examiner* — Zhubing Ren
(74) *Attorney, Agent, or Firm* — Wenderoth, Lind & Ponack, L.L.P.

(57) ABSTRACT

Provided is a coding method that allows reduction of a code amount necessary for coding reference indexes and improvement in the coding efficiency. The coding method according to the present invention is a method of coding a random accessible picture using inter-view reference, and includes: writing, into a slice header of the random accessible picture, a reference list modification syntax for modifying a reference picture list so that an inter-view reference picture is placed at the beginning of the reference picture list (S103); placing the inter-view reference picture at the beginning of the reference picture list (S104); and coding a current slice included in the random accessible picture, using the reference picture list (S105).

13 Claims, 24 Drawing Sheets

(56) References Cited

U.S. PATENT DOCUMENTS

| | | | |
|---|---|---|---|
| 2006/0146141 A1 | 7/2006 | Xin et al. | |
| 2006/0146143 A1 | 7/2006 | Xin et al. | |
| 2007/0030356 A1 | 2/2007 | Yea et al. | |
| 2007/0109409 A1 | 5/2007 | Yea et al. | |
| 2007/0121722 A1 | 5/2007 | Martinian et al. | |
| 2008/0117985 A1* | 5/2008 | Chen et al. | 375/240.26 |
| 2008/0198924 A1* | 8/2008 | Ho et al. | 375/240.01 |
| 2009/0323824 A1* | 12/2009 | Pandit et al. | 375/240.26 |
| 2010/0020871 A1* | 1/2010 | Hannuksela et al. | 375/240.12 |
| 2010/0027615 A1* | 2/2010 | Pandit et al. | 375/240.01 |
| 2010/0046619 A1* | 2/2010 | Koo et al. | 375/240.12 |

OTHER PUBLICATIONS

Extended European Search Report issued Jul. 16, 2013 in corresponding European Application No. 10755706.8.

"Information Technology—Coding of audio-visual objects—Part 10: Advanced Video Coding, Amendment 1: Multiview Video Coding," MPEG Meeting, Jul. 21, 2008-Jul. 25, 2008, XP030016472, ISSN: 0000-0039.

Junyan Huo et al., "A Flexible Reference Picture Selection Method for Spatial DIRECT Mode in Multiview Video Coding," IEEE 2008 Congress on Image and Signal Processing, Piscataway, NJ, USA, May 27, 2008, pp. 268-272, XP031286560, ISBN: 978-0-7695-3119-9.

* cited by examiner

FIG. 3

| Value of reference index | Coded binary symbol |
|---|---|
| 0 | 1 |
| 1 | 010 |
| 2 | 011 |
| 3 | 00100 |
| 4 | 00101 |

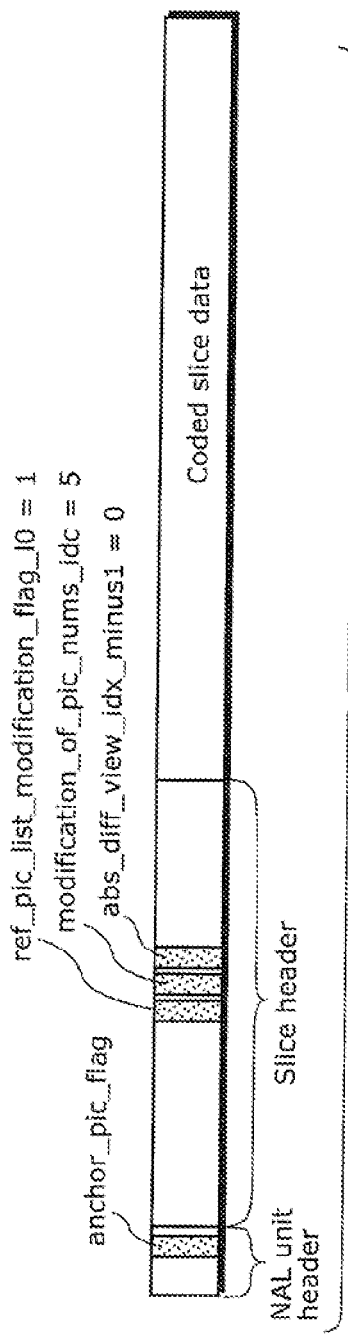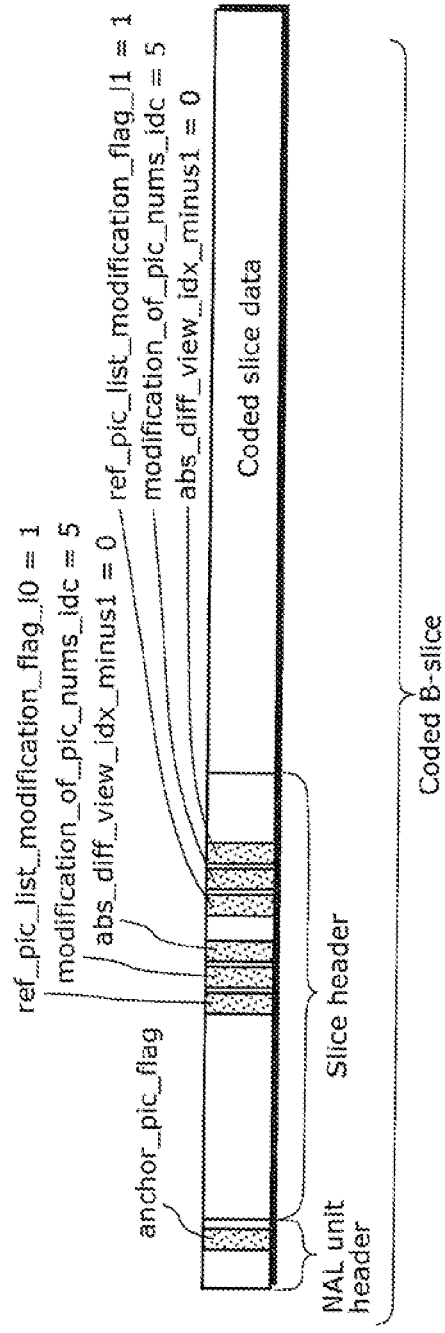

CODING METHOD, ERROR DETECTING METHOD, DECODING METHOD, CODING APPARATUS, ERROR DETECTING APPARATUS, AND DECODING APPARATUS

TECHNICAL FIELD

The present invention relates to a coding method, an error detecting method, and a decoding method to be used for coding and decoding any multimedia data, and in particular to a coding method, an error detecting method, and a decoding method to be used for coding and decoding multi-view video.

BACKGROUND ART

There are several methods of producing visual effects of 3D to a viewer. One of the methods is to present two sets of moving pictures separately to the viewer's left and right eyes. This is called stereoscopic imaging which involves capturing of the two sets of moving pictures using two cameras. One of the techniques used previously to present stereoscopic video is using filtering of color components where each eye can only view. Such techniques reduce the resolution of a picture that reaches each eye.

Recently, with the advancement in display technologies, viewers are now able to view full resolution video with each eye. The video standard H.264/MPEG-4 AVC Multiview Video Coding (MVC) is designed for the compression of such 3D imaging where each view is presented in the full resolution.

The video standard H.264/MPEG-4 AVC Multiview Video Coding (MVC) provides a set of compression tools which allow the efficient compression of moving pictures targeted for more than one set of views. The video standard MVC allows the compression of pictures using predictive coding from reconstructed pictures of a different set of views. This "inter-view" prediction utilizes the correlation of pictures captured by different cameras at approximately the same time to efficiently compress the pictures.

In the video standard MVC, the "inter-view" prediction is performed only on pictures of different views having the same picture order count information. The picture order count information is used to indicate the order of reconstructed pictures of the same view. In the video standard MVC, pictures (or view components as defined in the MVC standard) of different views having the same picture order count information are grouped together as a container called an access unit.

In the video standard MVC, an anchor picture is defined as a coded picture in which all slices reference only to slices within the same access unit. An anchor picture is identified by a bit carried in the NAL Unit header of the coded picture as shown in FIG. 1. More specifically, the anchor picture is identified by the bit indicated by an anchor_pic_flag parameter. Here, FIG. 1 illustrates an example of a data structure of an access unit.

This bit allows an MVC decoder to identify the anchor pictures in the coded video sequence and treat them as random access points where the MVC decoder may successfully reconstruct the pictures without decoding pictures before the anchor pictures.

As shown in FIG. 1, the access unit contains view components where only a view component of a view 1 is a base view component while the rest of the view components are non-base view components. The non-base view component that immediately follows the base view component is the first non-base view component.

The H.264/MPEG-4 AVC High Profile is widely used in various applications, such as High Definition Storage Media and High Definition Digital Video Broadcast. The Multiview High Profile defined in the video standard MVC Is designed as an extension of the H.264/MPEG-4 AVC High Profile where existing implementation of H.264/MPEG-4 AVC High Profile decoders can be easily modified to support the decoding of compressed video streams using the Multiview High Profile.

As described above, the anchor pictures can be used as random access points. Thus, the anchor pictures are essential to these applications where functionalities like trick play or stream switching are necessary.

An anchor picture is defined in the video standard MVC as a coded picture in which all slices reference only to slices within the same access unit. In the video standard MVC, an access unit consists of one or more view components depending on the number of views supported.

For most applications, to achieve better compression efficiency, only one of the view components in an anchor access unit will be Intra coded and the rest of the view components within the same anchor access unit will be Inter coded. The Inter coded view components utilize inter-view prediction from the Intra coded view components. An Intra coded view component utilizes only spatial prediction tools (e.g. Intra Prediction) for the reconstruction of the view.

In video standard like H.264/MPEG-4 AVC or MVC, reference picture lists are used to identify the reference pictures that can be used for the prediction of samples for each image. When each coded block of a coded picture is decoded, a reference picture for prediction can be referred to by signaling an index to the reference picture list (see PTL 1).

An initialized process is defined in MVC for the creation of these lists for both inter prediction and inter-view prediction of samples for each view component. As defined in the video standard MVC, the initialized process of the reference list will place the reference pictures belonging to the same view at the beginning of the list and the inter-view reference pictures at the end of the list. An example of such a reference picture list is shown in FIG. 2. Here, FIG. 2 illustrates an example of the initialized process of the conventional reference picture list.

As described above, the predictive coding can be performed using the reference picture list indicating intra-view reference pictures (inter prediction) and inter-view reference pictures.

CITATION LIST

[Patent Literature]
[PTL 1] Japanese Unexamined Patent Application Publication No. 2007-159111

SUMMARY OF INVENTION

Technical Problem

One problem with the prior art is that an index (reference index) may need to be signaled to the reference picture list for each block in a view component, and that the bits to transfer these indexes may be large and the coding is not efficiently performed.

As shown in FIG. 1, signaling of reference indexes is performed in each macroblock of a slice. As inter prediction (prediction from a previously reconstructed picture of the same view) of an anchor picture is not allowed, most of the indexes in the reference picture list will not be used.

More specifically in an example illustrated in FIG. 2, when pictures included in an access unit 10 are anchor pictures, in the case where a view component 20 included in a second view is coded, reference pictures A to D are not referenced to, but an inter-view reference picture E is referenced to. Thus, for each macroblock, a reference index [4] is frequently coded while reference indexes [0] to [3] are not coded.

Generally, the bits to signal a reference index to the reference picture list will increase with increasing a value of a reference index as illustrated in FIG. 3. FIG. 3 illustrates a relationship between values of reference indexes and the number of bits to code the reference indexes when the type of entropy coding used for coding a slice is a variable length entropy coding.

As illustrated in FIG. 3, since an inter-view reference picture is always appended to the reference picture list, the values of the reference indexes to the inter-view reference pictures will not be small and the bits to code these reference indexes in a view component are quite significant.

The present invention has been conceived to solve the problems, and has an object of providing a coding method and a coding apparatus that can reduce a code amount necessary for coding the reference index and improve the coding efficiency.

Solution to Problem

In order to solve the problems, the coding method according to an aspect in the present invention is a coding method of coding a random accessible picture using inter-view reference, and includes: writing, into a slice header of the random accessible picture, a first reference list modification syntax for modifying a first reference picture list so that an inter-view reference picture is placed at the beginning of the first reference picture list; placing the inter-view reference picture at the beginning of the first reference picture list; and coding a current slice included in the random accessible picture, using the first reference picture list.

Since there are many cases where, when the random accessible picture is coded, an inter-view reference picture is referenced to, and the reference index indicating the inter-view reference picture becomes a smaller value in the coding method according to the present invention. Thus, the code amount necessary for coding the reference index can be reduced, and the coding efficiency can be improved.

Moreover, the coding method may further include writing into a NAL unit header, wherein the writing into a NAL unit header may include: setting a value indicating that the current slice is included in an anchor picture, to an anchor_pic_flag parameter; and writing the anchor_pic_flag parameter into the NAL unit header.

Since the value indicating the anchor picture can be written into the NAL unit header, only parsing the NAL unit header in decoding can determine whether or not an image to be decoded is an anchor picture.

Moreover, the writing of a first reference list modification syntax may further include: determining whether or not a slice type of the current slice is a B-slice; and writing a second reference list modification syntax into the slice header when the slice type of the current slice is the B-slice, the second reference list modification syntax being a syntax for modifying a second reference picture list so that an inter-view reference picture is placed at the beginning of the second reference picture list, and the second reference picture list being different from the first reference picture list.

Thereby, even when reference picture lists are used, an inter-view reference picture can be placed at the beginning of each of the reference picture lists, and the code amount necessary for coding the reference index can be reduced. Thus, the coding efficiency can be improved.

Moreover, the writing of a first reference list modification syntax may include: setting a value indicating that the first reference picture list is modified, to a ref_pic_list_modification_flag_l0 parameter; writing the ref_pic_list_modification_flag_l0 parameter into the slice header; setting a value indicating that a first abs_diff_view_idx_minus1 parameter corresponds to a value to be added to a prediction value of the inter-view reference index, to a first modification_of_pic_nums_idc parameter; writing the first modification_of_pic_nums_idc parameter into the slice header; setting 0 to the first abs_diff_view_idx_minus1 parameter; writing the first abs_diff_view_idx_minus1 parameter into the slice header; setting a value indicating that the modification of the first reference picture list is completed, to a second modification_of_pic_nums_idc parameter; and writing the second modification_of_pic_nums_idc parameter into the slice header.

Since the parameters each indicating that an inter-view reference picture is placed at the beginning of a reference picture list can be written into the slice header, only parsing the slice header in decoding can determine whether or not the reference picture list has been modified.

Moreover, the writing of a first reference list modification syntax may include writing the ref_pic_list_modification_flag_l0 parameter, the first modification_of_pic_nums_idc parameter, and the first abs_diff_view_idx_minus1 into the slice header in consecutive order.

Since the parameters are written in consecutive order, the slice header can be easily parsed in decoding.

Moreover, the writing of a second reference list modification syntax may include: setting a value indicating that the second reference W picture list is modified, to a ref_pic_list_modification_flag_l1 parameter; writing the ref_pic_list_modification_flag_l1 parameter into the slice header; setting a value indicating that a second abs_diff_view_idx_minus1 parameter corresponds to a value to be added to a prediction value of the inter-view reference index, to a third modification_of_pic_nums_idc parameter; writing the third modification_of_pic_nums_idc parameter into the slice header; setting 0 to the second abs_diff_view_idx_minus1 parameter; writing the second abs_diff_view_idx_minus1 parameter into the slice header; setting a value indicating that the modification of the second reference picture list is completed, to a fourth modification_of_pic_nums_idc parameter; and writing the fourth modification_of_pic_nums_idc parameter into the slice header.

Since even in the case where a plurality of reference picture lists are used, the parameters each indicating that an inter-view reference picture is placed at the beginning of a reference picture list can be written into the slice header for each of the reference picture lists, only parsing the slice header in decoding can determine whether or not each of the reference picture lists has been modified.

Moreover, the writing of a second reference list modification syntax may include writing the ref_pic_list_modification_flag_l1 parameter, the third modification_of_pic_nums_idc parameter, and the second abs_diff_view_idx_minus1 parameter into the slice header in consecutive order.

Since the parameters are written in consecutive order, the slice header can be easily parsed in decoding.

Moreover, the random accessible picture may be an anchor picture.

Moreover, the error detecting method according to an aspect in the present invention is an error detecting method of detecting an error in a random accessible picture coded using inter-view reference, and the method includes: setting, to a detected_error_flag parameter, a value indicating that no error has occurred in the random accessible picture; reading, from a slice header of the random accessible picture, at least one parameter included in a modification syntax, and determining whether or not an error has occurred in the read parameter, the modification syntax being a syntax for modifying a reference picture list so that an inter-view reference picture is placed at the beginning of the reference picture list; and setting, to the detected_error_flag parameter, a value indicating that the error has occurred in the random accessible picture when it is determined that the error has occurred, wherein at least one of determination processes is performed in the determining, the determination processes including: (i) a first determination process of reading a ref_pic_list_modification_flag_l0 parameter from the slice header as the read parameter, determining whether or not the read ref_pic_list_modification_flag_l0 parameter is a value indicating that the reference picture list is modified, and determining that the error has occurred when the ref_pic_list_modification_flag_l0 parameter does not indicate the value indicating that the reference picture list is modified; (ii) a second determination process of reading a modification_of_pic_nums_idc parameter from the slice header as the read parameter, determining whether or not the read modification_of_pic_nums_idc parameter is a value indicating that an abs_diff_view_idx_minus1 parameter corresponds to a value to be added to a prediction value of an inter-view reference index, and determining that the error has occurred when the read modification_of_pic_nums_idc parameter does not indicate the value indicating that the abs_diff_view_idx_minus1 parameter corresponds to the value to be added to the prediction value of the inter-view reference index; and (iii) a third determination process of reading the abs_diff_view_idx_minus1 parameter from the slice header as the read parameter, determining whether or not the read abs_diff_view_idx_minus1 parameter is 0, and determining that the error has occurred when the abs_diff_view_idx_minus1 parameter does not indicate 0.

Thereby, it can be determined whether or not a coded random accessible picture is correctly coded by modifying a reference picture list so that an inter-view reference picture is placed at the begging of the reference picture list.

Moreover, the ref_pic_list_modification_flag_l0, the modification_of_pic_nums_idc parameter, and the abs_diff_view_idx_minus1 parameter may be written into the slice header in consecutive order, and the first determination process, the second determination process, and the third determination process may be performed in consecutive order until it is determined in one of the processes that the error has occurred.

Thereby, the error can be detected when a correct value is not written in any one of the parameters.

Moreover, the random accessible picture may be an anchor picture.

Moreover, the decoding method according to an aspect in the present invention is a decoding method of decoding a random accessible picture coded using inter-view reference, and the method includes: parsing a slice header of the random accessible picture to determine whether or not a reference picture list has been modified so that an inter-view reference picture is placed at the beginning of the reference picture list; generating a prediction image in accordance with a predetermined standard when it is determined in the parsing that the reference picture list has been modified, and generating a prediction image according to a method different from the predetermined standard when it is determined in the parsing that the reference picture list has not been modified; and decoding a current slice included in the random accessible picture, based on the prediction image.

Thereby, the coded random accessible picture can be correctly decoded by modifying a reference picture list so that an inter-view reference picture is placed at the begging of the reference picture list.

Moreover, the parsing may include determining whether or not a ref_pic_list_modification_flag_l0 is a value indicating that the reference picture list has been modified.

Thereby, it can be determined whether or not a reference picture list has been modified only by reading the ref_pic_list_modification_flag_l0 parameter.

Moreover, when the ref_pic_list_modification_flag_l0 is a value indicating that the reference picture list has been modified, the generating may include: (i) reading a modification syntax for modifying the reference picture list from the slice header; (ii) placing the inter-view reference picture at the beginning of the reference picture list; and (iii) generating the prediction image through motion prediction using the reference picture list.

Thereby, the reference picture list can be modified only by decoding a stream in accordance with the standard, and thus the coded random accessible picture can correctly be decoded.

Moreover, when the ref_pic_list_modification_flag_l0 is not a value indicating that the reference picture list has been modified, the generating may include generating the prediction image using an image of a base view as a reference image without reference to a reference index.

Thereby, even when the reference picture list has not been modified, the random accessible picture can correctly be decoded.

The present invention can be implemented not only as a coding method, an error detecting method, and a decoding method, but also as an apparatus including processing units corresponding to processing steps included in the coding method, the error detecting method, and the decoding method.

Advantageous Effects of Invention

According to an implementation of the present invention, the code amount necessary for coding the reference index can be reduced, and thus, the coding efficiency can be improved.

BRIEF DESCRIPTION OF DRAWINGS

FIG. 3 illustrates an example of a relationship between values of reference indexes and the number of bits when values of the reference indexes are coded by variable length entropy coding.

FIG. 7A illustrates an example of a stream structure of a coded non-base view component (P-picture) in an anchor access unit according to Embodiment 1 in the present invention.

FIG. 7B illustrates an example of a stream structure of a coded non-base view component (B-picture) in an anchor access unit according to Embodiment 1 in the present invention.

DESCRIPTION OF EMBODIMENTS

Embodiments of the present invention will be hereinafter described in detail with reference to drawings.

(Embodiment 1)

The coding method according to Embodiment 1 is a coding method of coding a random accessible picture using inter-view reference, and includes: writing, into a slice header of the random accessible picture, a reference list modification syntax for modifying a reference picture list indicating intra-view reference pictures and inter-view reference pictures so that an inter-view reference picture is placed at the beginning of the reference picture list; placing the inter-view reference picture at the beginning of the reference picture list; and coding the random accessible picture, using the reference picture list.

First, an example of a coding apparatus that executes a coding method according to the present invention will be described.

Figure 4:
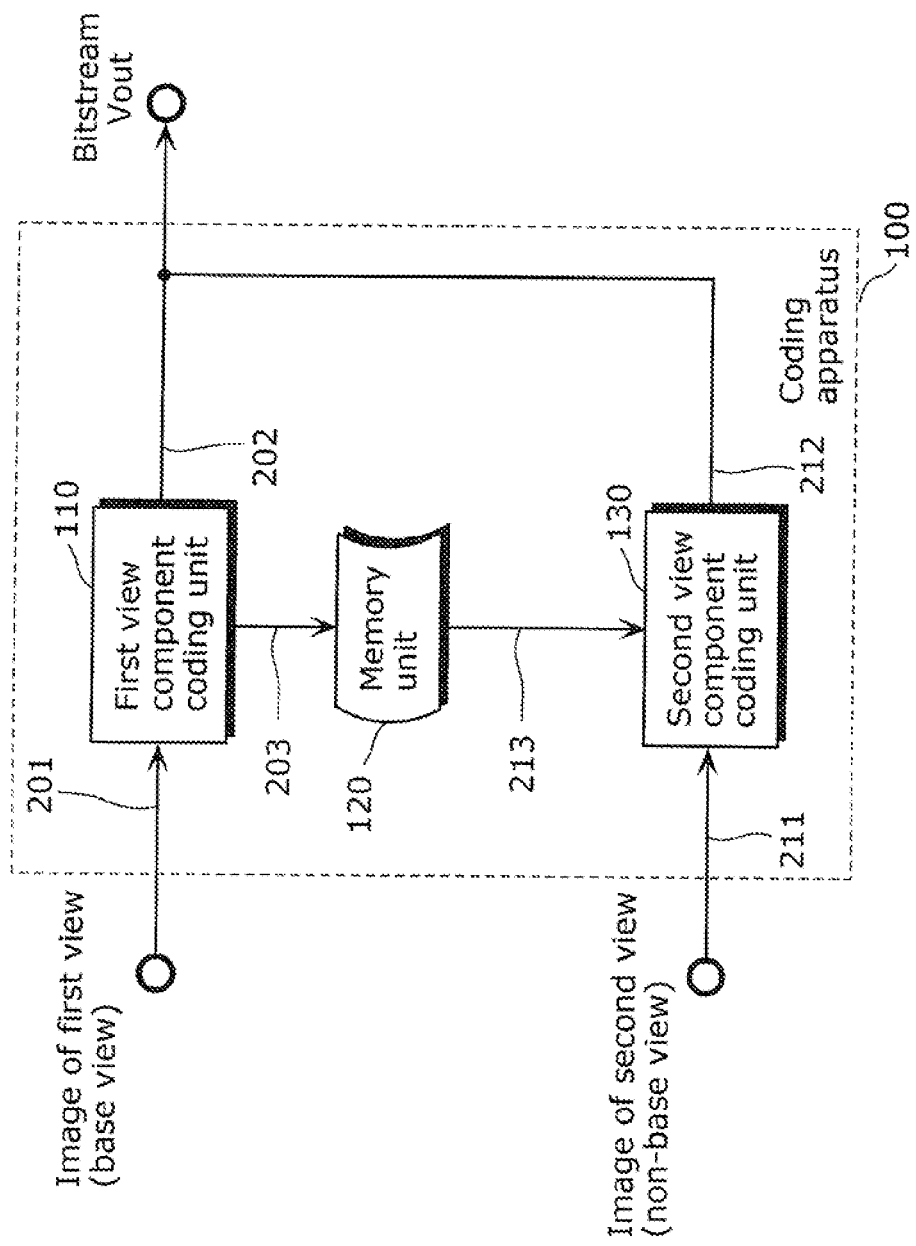
FIG. 4 is a block diagram illustrating an example of a configuration of a coding apparatus according to Embodiment 1 in the present invention.

FIG. 4 illustrates an example of a configuration of a coding apparatus 100 according to Embodiment 1 in the present invention. The coding apparatus 100 is a coding apparatus that codes images including a plurality of views. In the example of FIG. 4, the coding apparatus 100 codes images of a base view and a non-base view. The coding apparatus 100 includes a first view component coding unit 110, a memory unit 120, and a second view component coding unit 130.

The first view component coding unit 110 obtains an image of the first view, that is, a base view image 201, and compress-codes the obtained base view image 201 to generate a compressed base view component 202. The first view component coding unit 110 outputs the generated compressed base view component 202 as a bitstream. Furthermore, the first view component coding unit 110 locally decodes the compressed base view component 202 to generate a reconstructed image 203. The reconstructed image 203 is stored in the memory unit 120.

The memory unit 120 is a memory for storing a reference image. More specifically, the memory unit 120 stores the reconstructed image 203 generated by the first view component coding unit 110 as a reference image.

The second view component coding unit 130 obtains an image of the second view, that is, a non-base view image 211, and compress-codes the obtained non-base view image 211 to generate a compressed non-base view component 212. More specifically, the second view component coding unit 130 reads a reference image 213 from the memory unit 120, generates a prediction image using the read reference image 213, and codes a difference between the generated prediction image and the non-base view image 211. The second view component coding unit 130 outputs the generated compressed non-base view component 212 as a bitstream.

Furthermore, the second view component coding unit 130 modifies a reference picture list when coding a random accessible picture, for example, an anchor picture. The detailed configuration of the second view component coding unit 130 will be described with reference to FIG. 5 later.

Figure 5:
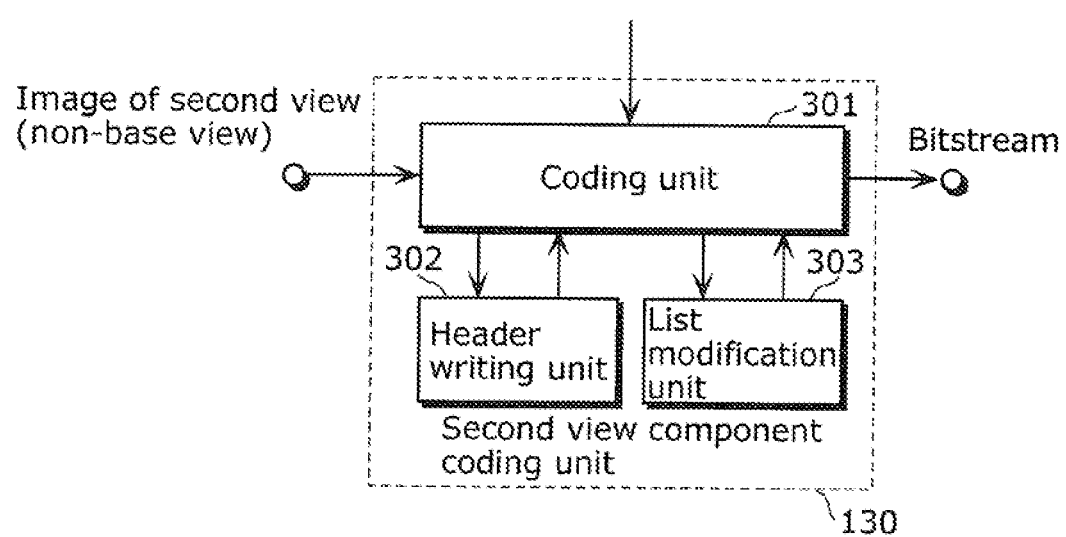
FIG. 5 is a block diagram illustrating an example of a configuration of a coding unit that codes a non-base view component according to Embodiment 1 in the present invention.

FIG. 5 is a block diagram illustrating an example of a configuration of the second view component coding unit 130 according to Embodiment 1 in the present invention. As illustrated in FIG. 5, the second view component coding unit 130 includes a coding unit 301, a header writing unit 302, and a list modification unit 303.

The coding unit 301 codes the non-base view image 211 using a reference picture list to generate the compressed non-base view component 212. More specifically, the coding unit 301 reads the reference image 213 from the memory unit 120 using the reference picture list modified by the list modification unit 303, when the non-base view image 211 to be coded is an image included in a random accessible picture. Here, the random accessible picture is, for example, an anchor picture.

When the inter-view reference is performed for coding an anchor picture, the reference image 213 read from the memory unit 120 is a reconstructed image of the base view that is included in the same access unit. Then, the coding unit 301 generates the prediction image using the read reference image 213, and codes the difference between the generated prediction image and the non-base view image 211.

The header writing unit 302 writes a modification syntax for modifying the reference picture list into a slice header when the non-base view image 211 is the image included in the random accessible picture. The modification syntax is, for example, a reference list MVC modification syntax, and is indicated by a ref_pic_list_mvc_modifications( ) parameter in FIG. 1. The specific example of the modification syntax written by the header writing unit 302 will be described later.

Figure 2:
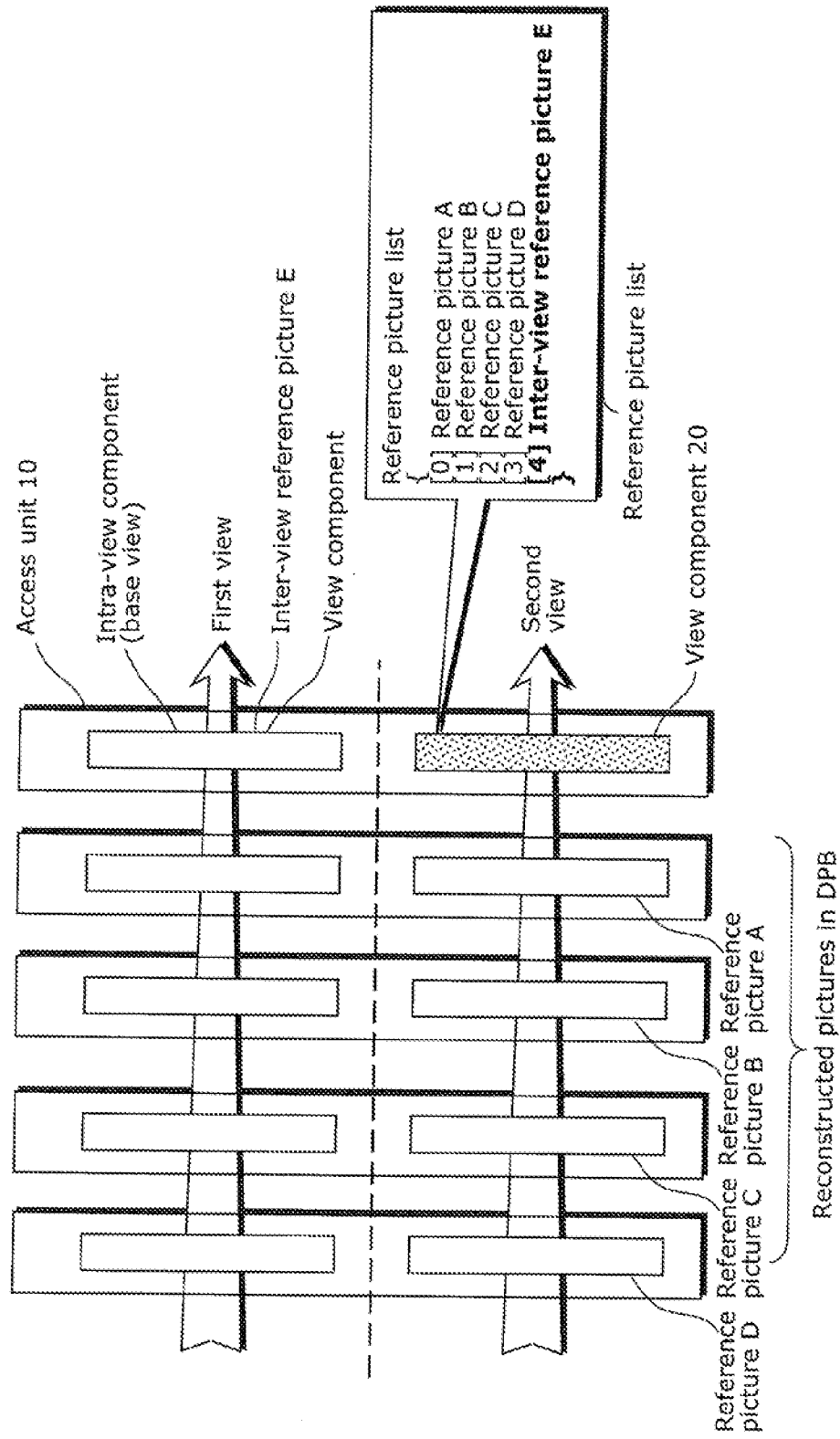
FIG. 2 illustrates an example of an initialized process of a conventional reference picture list.

Here, the reference picture list is a list indicating an association between reference indexes and reference images. As illustrated in FIG. 2, intra-view reference pictures and inter-view reference pictures are respectively associated with reference indexes, in the reference picture list.

Furthermore, the header writing unit 302 writes an anchor_pic_flag parameter in a NAL unit header. More specifically, when the non-base view image 211 is the image included in the random accessible picture, the header writing unit 302 sets a value indicating that the picture is an anchor picture (specifically, 1) to the anchor_pic_flag parameter, and writes the set anchor_pic_flag parameter into the NAL unit header. The specific example of the anchor_pic_flag parameter will be described later.

The list modification unit 303 is an example of a placing unit according to the present invention, and modifies the reference picture list so that an inter-view reference picture is placed at the beginning of the reference picture list. In other words, the list modification unit 303 changes the association between the reference indexes and the reference pictures. More specifically, the list modification unit 303 modifies the reference picture list so that the reference index [0] indicates an inter-view reference picture.

Figure 6:
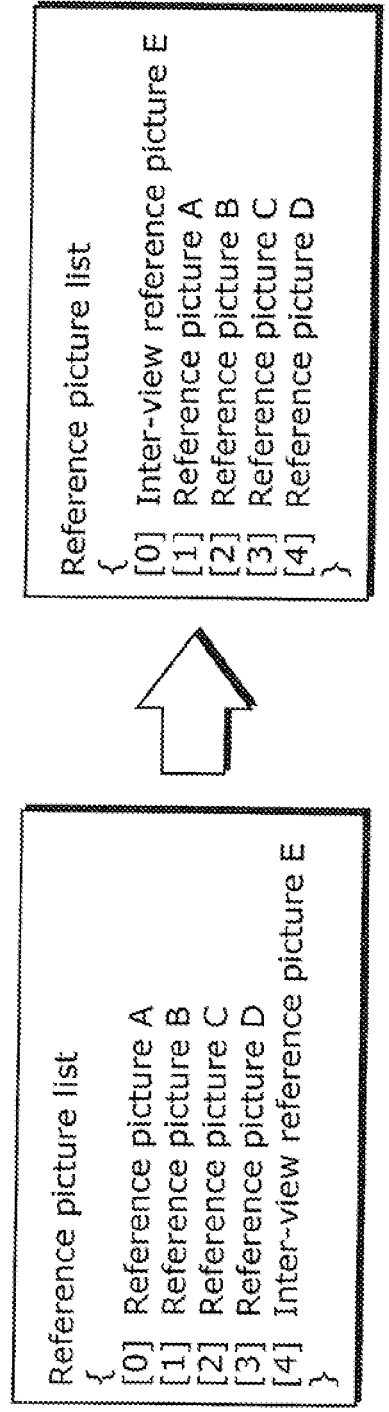
FIG. 6 illustrates an example of modifying a reference picture list according to Embodiment 1 in the present invention.

For example, as illustrated in FIG. 6, the list modification unit 303 modifies the reference picture list so that the inter-view reference picture associated with the reference index [4] is associated with the reference index [0]. Thereby, when the non-base view image 211 is the image included in the random accessible picture, the code amount necessary for coding the reference index can be reduced.

For example, when the non-base view image 211 included in the view component 20 of FIG. 2 is an image included in an anchor picture, images in the same access unit are only the images to be referenced to. In other words, when the non-base view image 211 is coded, the inter-view reference picture E is referenced to without reference to reference pictures A to D.

Thus, the reference index to be frequently used is the reference index [0], and can be indicated by 1 bit in the example of FIG. 3. Before modifying the reference picture list, the inter-view reference picture E is indicated by the reference index [4] that requires 5 bits. Thus, the code amount necessary for coding the reference index can be reduced.

With the aforementioned configuration, the coding apparatus 100 according to the present invention places an inter-view reference picture at the beginning of the reference picture list when coding a random accessible picture. Thereby, the reference index of the inter-view reference picture to be frequently used is indicated by a smaller value, so that the code amount necessary for coding the reference index, that is, the bit amount indicating the reference index can be reduced. Thus, the coding efficiency can be improved.

Figure 1:
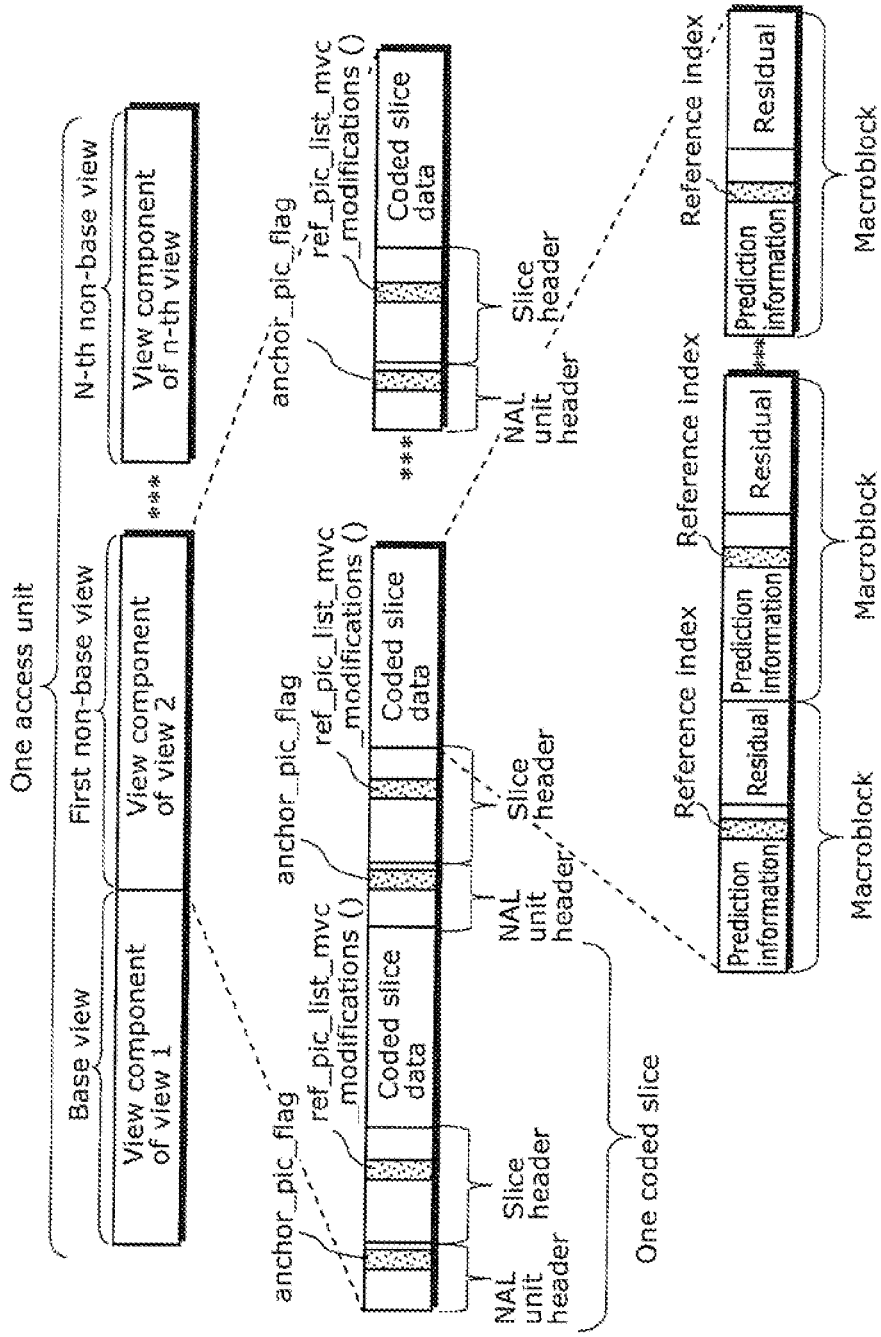
FIG. 1 illustrates an example of a data structure of an access unit.

The following will describe an example of a stream structure generated by coding non-base view components in an anchor access unit according to Embodiment 1 in the present invention. Here, positions of the non-base view components in the anchor access unit are illustrated in FIG. 1.

FIG. 7A illustrates an example of a stream structure of a coded P-slice of a non-base view component in an anchor access unit.

As illustrated in FIG. 7A, an anchor_pic_flag parameter is written in a NAL unit header. The anchor_pic_flag parameter is a flag to be used for determining whether or not an image having the anchor_pic_flag parameter is an image included in an anchor picture.

More specifically, the anchor_pic_flag parameter indicating 1 shows that all slices included in a picture have been coded with reference to only the slices in the same access unit, that is, do not use inter prediction (temporal direction). Furthermore, the anchor_pic_flag parameter indicating 1 shows that coded pictures following the current coded picture in display order do not refer to the pictures prior to the current coded picture in decoding order.

In other words, a picture having the anchor_pic_flag parameter whose value is set to 1 is randomly accessible. Conversely, the picture having the anchor_pic_flag parameter that is set to 0 is not randomly accessible. Thus, for example, the anchor_pic_flag parameter included in each NAL unit in an anchor picture is set to 0.

Furthermore, as illustrated in FIG. 7A, a ref_pic_list_modification_flag_l0 parameter, a modification_of_pic_nums_idc parameter, and an abs_diff_view_idx_minus1 parameter are written in a slice header. These 3 parameters correspond to the ref_pic_list_mvc_modifications( ) parameter in FIG. 1, that is, a reference list MVC modification syntax.

The ref_pic_list_modification_flag_l0 parameter is a parameter indicating whether or not a reference picture list is modified. More specifically, the ref_pic_list_modification_flag_l0 parameter indicating 1 shows that the first reference picture list (list 0) is modified, while the ref_pic_list_modification_flag_l0 parameter indicating 0 shows that the first reference picture list (list 0) is not modified.

Here, the first reference picture list is, for example, a list indicating reference pictures to be referenced to by a P-picture. Alternatively, the first reference picture list is, for example, a list indicating reference pictures in a single direction (forward direction, for example) from among reference pictures to be referenced to by a B-picture.

The modification_of_pic_nums_idc parameter is used together with other parameters, such as the abs_diff_view_idx_minus1 parameter, and is a parameter indicating a method of modifying a reference picture list. For example, the modification_of_pic_nums_idc parameter indicating 5 shows that the value of the abs_diff_view_idx_minus1 parameter corresponds to a value to be added to a prediction value of an inter-view reference index. Furthermore, the modification_of_pic_nums_idc parameter indicating 3 shows that the modification of a reference picture list is completed.

The abs_diff_view_idx_minus1 parameter indicates a value related to an inter-view reference index. More specifically, when the modification_of_pic_nums_idc parameter indicates 5, the value of abs_diff_view_idx_minus1 parameter corresponds to a difference value to be added to the prediction value of the inter-view reference index. Thus, when the abs_diff_view_idx_minus1 parameter indicates 0, the inter-view reference index is [0], and the inter-view reference picture is placed at the beginning of the reference picture list.

FIG. 7B illustrates an example of a stream structure of a coded B-slice of a non-base view component in an anchor access unit. Compared to the coded P-slice in FIG. 7A, a ref_pic_list_modification_I1 parameter, a modification_of_pic_nums_idc parameter, and an abs_diff_view_idx_minus1 parameter are additionally written into a slice header.

The ref_pic_list_modification_I1 parameter is a parameter indicating whether or not a reference picture list is modified. More specifically, the ref_pic_list_modification_I1 parameter indicating 1 shows that the second reference picture list (list 1) is modified, while the ref_pic_list_modification_I1 parameter indicating 0 shows that the second reference picture list (list 0) is not modified. Here, the second reference picture list is, for example, a list indicating reference pictures in a single direction (backward direction, for example) from among reference pictures to be referenced to by a B-picture.

Furthermore, the modification_of_pic_nums_idc parameter and the abs_diff_view_idx_minus1 parameter are the same as those in FIG. 7A, and thus the description is omitted.

The following will describe the coding apparatus 100 according to Embodiment 1 in the present invention.

Figure 8:
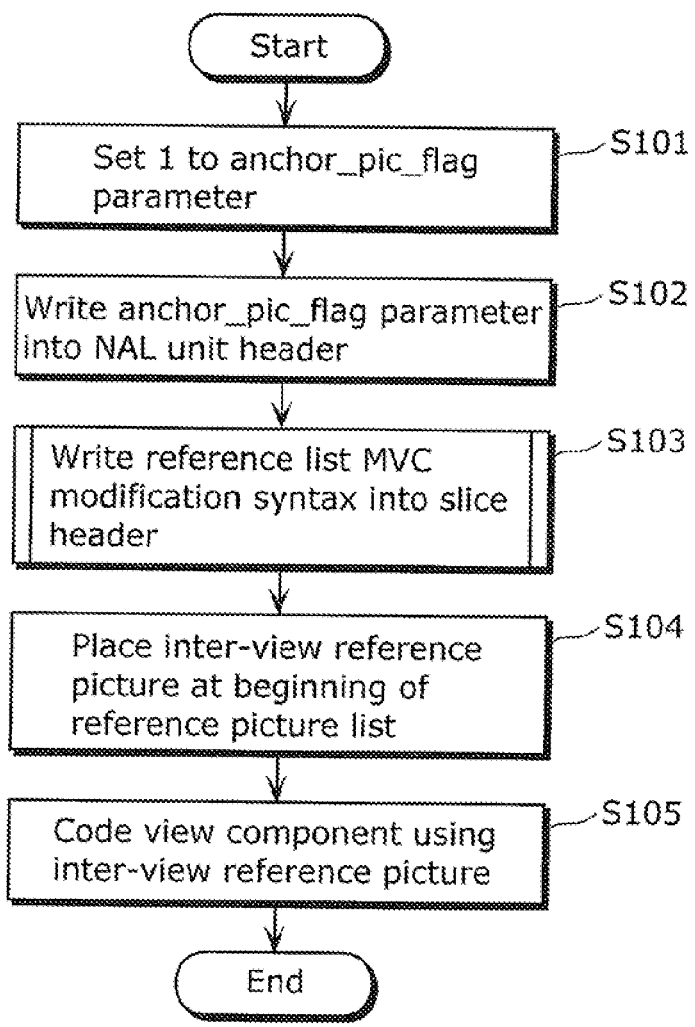
FIG. 8 is a flowchart showing an example of processes of coding a non-base view component in an anchor access unit according to Embodiment 1 in the present invention.

FIG. 8 shows an example of processes of coding a non-base view component in an anchor access unit according to Embodiment 1 in the present invention.

As illustrated in FIG. 8, the header writing unit 302 first sets 1 to an anchor_pic_flag parameter (S101). Next, the header writing unit 302 writes the anchor_pic_flag parameter into a NAL unit header of a slice (S102).

Then, the header writing unit 302 writes a reference list MVC modification syntax into a slice header (S103). Then, the list modification unit 303 places an inter-view reference picture at the beginning of a reference picture list (S104). Here, the inter-view reference picture is, for example, a non-base view component in an anchor access unit.

Finally, the coding unit 301 codes the non-base view component using the inter-view reference picture (S105).

As described above, the coding apparatus 100 according to Embodiment 1 in the present invention modifies the reference picture list so that the inter-view reference picture is placed at the beginning of the reference picture list when an image to be coded is an image included in a random accessible picture, such as an anchor picture. The following will describe the detailed process of writing the reference list MVC modification syntax (S103).

Figure 9:
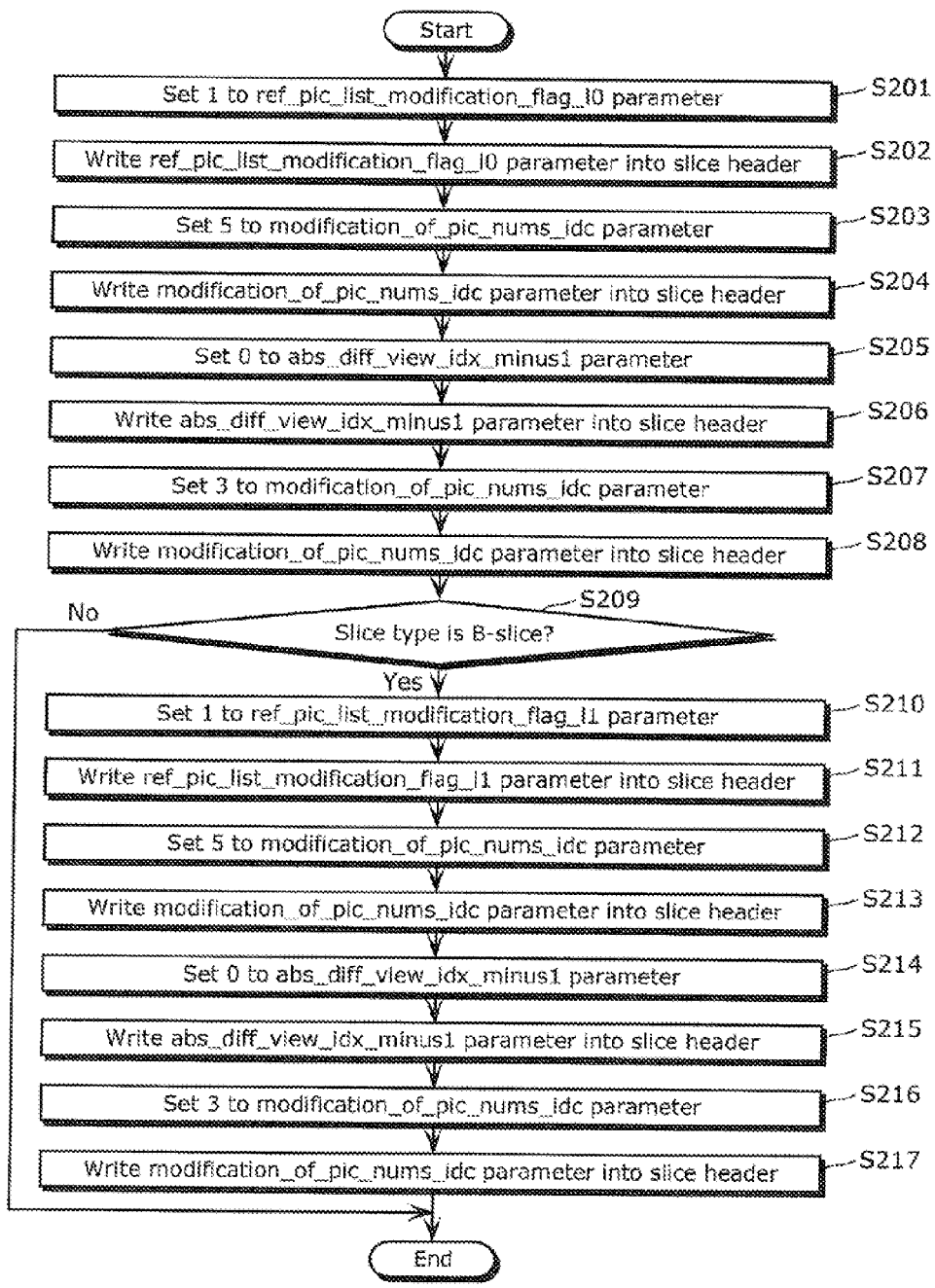
FIG. 9 is a flowchart showing an example of processes of writing a reference list MVC modification syntax when a non-base view component in an anchor access unit according to Embodiment 1 in the present invention is coded.

FIG. 9 is a flowchart showing an example of the process of writing the reference list MVC modification syntax when a non-base view component in an anchor access unit is coded according to Embodiment 1 in the present invention is coded.

As illustrated in FIG. 9, the header writing unit 302 first sets 1 to a ref_pic_list_modification_flag_I0 parameter (S201). Then, the header writing unit 302 writes the ref_pic_list_modification_flag_I0 parameter into a slice header (S202). As such, the header writing unit 302 writes a value indicating that the reference picture list (first reference picture list) is modified into the slice header.

Next, the header writing unit 302 sets 5 to a first modification_of_pic_nums_idc parameter (S203). Then, the header writing unit 302 writes the first modification_of_pic_nums_idc parameter after the ref_pic_list_modification_flag_I0 parameter, into the slice header (S204).

Next, the header writing unit 302 sets 0 to the abs_diff_view_idx_minus1 parameter (S205). Then, the header writing unit 302 writes the abs_diff_view_idx_minus1 parameter after the first modification_of_pic_nums_idc parameter in the slice header (S206). As such, the header writing unit 302 writes, into the slice header, a value indicating that an inter-view reference picture is placed at the beginning of the reference picture list.

Next, the header writing unit 302 sets 3 to a second modification_of_pic_nums_idc parameter (S207). Then, the header writing unit 302 writes the second modification_of_pic_nums_idc parameter after the first abs_diff_view_idx_minus1 parameter in the slice header (S208). As such, the header writing unit 302 writes a value indicating that the modification of the reference picture list is completed into the slice header.

Sometimes, the second modification_of_pic_nums_idc parameter indicating 3 is not written immediately after the abs_diff_view_idx_minus1 parameter in the slice header, but at least once before the ref_pic_list_modification_flag_I0 parameter or at the last parameter of the reference list MVC modification syntax.

Here, it is determined whether or not the slice type is a B-slice (S209). The determination is made by, for example, the coding unit 301 or a control unit (not illustrated in FIGS. 4 and 5).

When the slice type is a P-slice (No at S209), the process of writing the reference list MVC modification syntax is completed.

When the slice type is a B-slice (Yes at S209), the header writing unit 302 writes a new parameter after the second modification_of_pic_nums_idc parameter indicating 3. More specifically, the header writing unit 302 first sets 1 to the ref_pic_list_modification_flag_I1 parameter (S210). Then, the header writing unit 302 writes the ref_pic_list_modification_flag_I1 parameter into an slice header (S211). As such, the header writing unit 302 writes a value indicating that the second reference picture list is modified into the slice header.

Next, the header writing unit 302 sets 5 to a new modification_of_pic_nums_idc parameter (S212), and writes the new modification_of_pic_nums_idc parameter after the ref_pic_list_modification_flag_I1 parameter in the slice header (S213). Then, the header writing unit 302 sets 0 to a new abs_diff_view_idx_minus1 parameter (S214), and writes the new abs_diff_view_idx_minus1 parameter after the modification_of_pic_nums_idc parameter in the slice header (S215). As such, the header writing unit 302 writes, into the slice header, a value indicating that an inter-view reference picture is placed at the beginning of the reference picture list.

Finally, the header writing unit 302 sets 3 to the last modification_of_pic_nums_idc parameter (S216), and writes the modification_of_pic_nums_idc parameter at the last parameter of the reference list MVC modification syntax (S217).

With the aforementioned configuration, when coding a random accessible picture, for example, an anchor picture, the coding apparatus 100 according to the present invention writes, into a slice header, a syntax indicating that an inter-view reference picture is placed at the beginning of the reference picture list. Furthermore, when coding an image included in a non-base view anchor picture, the coding apparatus 100 modifies a reference picture list so that the inter-view reference picture is placed at the beginning of the reference picture list, and codes the image of the non-base view in accordance with the modified reference picture list.

Thereby, the value of the reference index of the inter-view reference picture to be frequently used can be reduced, and the code amount necessary for coding the reference index can be reduced. Furthermore, since the slice header of a coded stream includes a syntax indicating that the reference picture list is modified, the decoding apparatus can appropriately decode the coded stream.

Although Embodiment 1 describes the example in which an anchor access unit includes two view components, that is, a base view component and a non-base view component, it may include plural non-base view components as illustrated in FIG. 1.

In this case, the list modification unit 303 modifies the reference picture list so that reference indexes respectively indicating inter-view reference pictures are smaller than a reference index indicating an intra-view reference picture. For example, when a non-base view component (first non-base view component) references to view components (a base view component and a second non-base view component), for example, the list modification unit 303 modifies the reference picture list so that the reference index [0] indicates the base view component and the reference index [1] indicates the second non-base view component.

(Embodiment 2)

The error detecting method according to Embodiment 2 is an error detecting method of detecting an error in a random accessible picture coded using inter-view reference, and the method includes: setting, to a predetermined error detection flag, a value indicating that no error has occurred in the random accessible picture; reading, from a slice header, one parameter included in a modification syntax for modifying a reference picture list so that an inter-view reference picture is placed at the beginning of the reference picture list, and determining whether or not an error has occurred in the read parameter; and setting, to the error detection flag, a value indicating that the error has occurred when it is determined that the error has occurred.

Furthermore, the decoding method according to Embodiment 2 is a decoding method of decoding a random accessible picture coded using inter-view reference, and the method includes: parsing a slice header of the random accessible picture to determine whether or not a reference picture list has been modified so that an inter-view reference picture is placed at the beginning of the reference picture list; generating a prediction image in accordance with a predetermined standard when it is determined in the parsing that the reference picture list has been modified, and generating a prediction image according to a method different from the predetermined standard when it is determined in the parsing that the reference picture list has not been modified; and decoding the random accessible picture, based on the prediction image.

First, an example of a configuration of a decoding apparatus that executes the error detection method and the decoding method according to Embodiment 2 in the present invention will be described.

Figure 10:
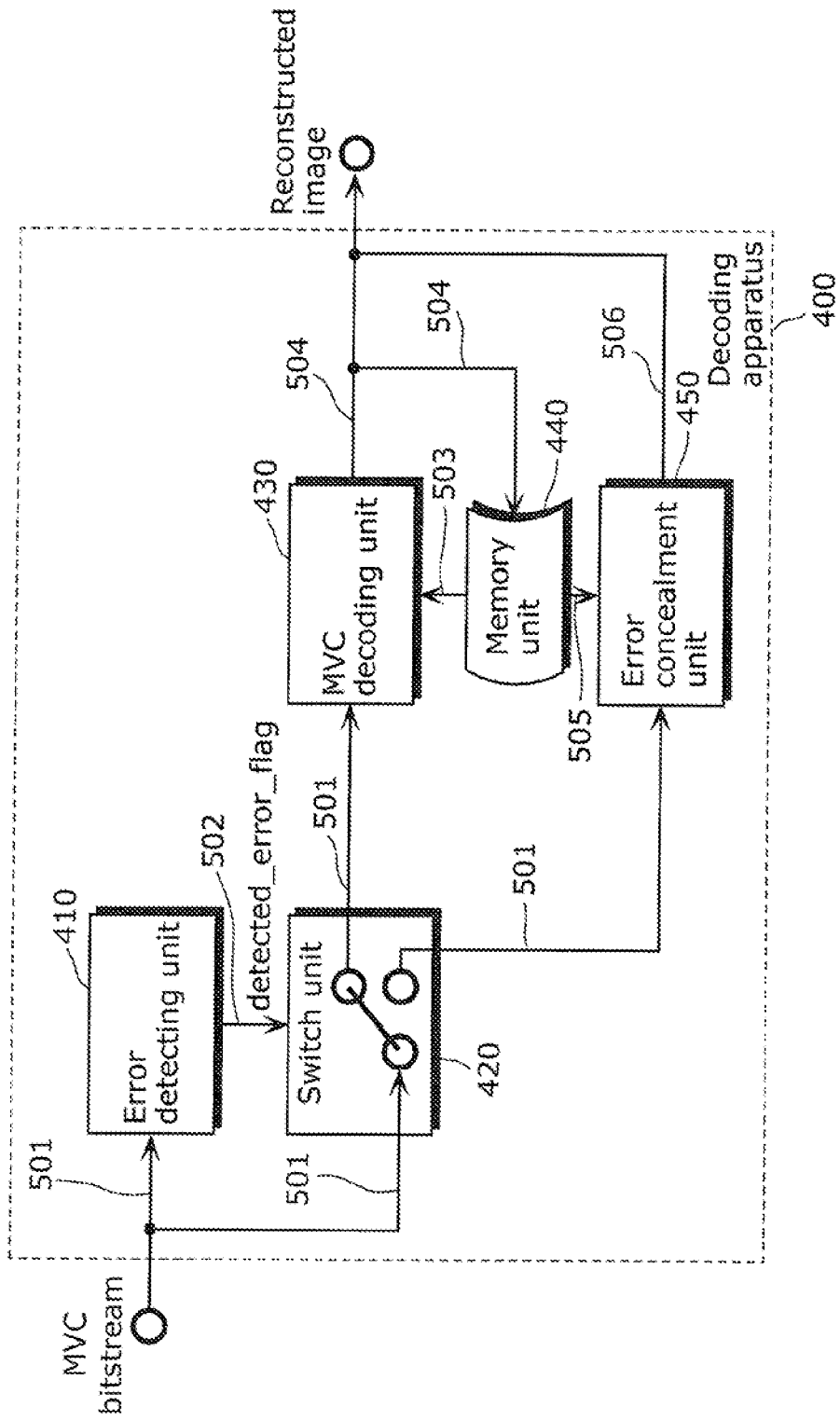
FIG. 10 is a block diagram illustrating an example of a configuration of a decoding apparatus according to Embodiment 2 in the present invention.

FIG. 10 is a block diagram illustrating an example of a configuration of a decoding apparatus 400 according to Embodiment 2 in the present invention. The decoding apparatus 400 is an apparatus that decodes a coded stream (MVC bitstream 501) generated by coding images of views, and has a function of detecting an error in the bit stream. As illustrated in FIG. 10, the decoding apparatus 400 includes an error detecting unit 410, a switch unit 420, an MVC decoding unit 430, a memory unit 440, and an error concealment unit 450.

The error detecting unit 410 is an example of a processing unit that executes the error detection method according to Embodiment 2 in the present invention. The error detecting unit 410 detects an error in a coded picture that is included in the MVC bitstream 501 and is a random accessible picture that has been coded using inter-view reference. For example, the error detecting unit 410 determines whether or not an error has occurred in a compressed non-base view component included in an anchor unit.

When detecting an error, the error detecting unit 410 sets a value indicating that an error has occurred to a predetermined error detection flag 502, and provides the set error detection flag 502 to the switch unit 420. In the example of FIG. 10, the error detection flag 502 is indicated by a detected_error_flag parameter. When detecting an error, the error detecting unit 410 sets 1 to the detected_error_flag parameter. When the error detecting unit 410 detects no error, for example, in an initial state, it sets 0 to the detected_error_flag parameter. The detailed configuration of the error detecting unit 410 will be described later.

The switch unit 420 switches between the MVC decoding unit 430 and the error concealment unit 450 according to the error detection flag 502 to output the MVC bitstream 501. More specifically, the switch unit 420 outputs the MVC bitstream 501 to the error concealment unit 450 when the error detection flag 502 indicates that an error has occurred. For example, the switch unit 420 outputs the MVC bitstream 501 to the error concealment unit 450 when the detected_error_flag parameter indicates 1.

Furthermore, the switch unit 420 outputs the MVC bitstream 501 to the MVC decoding unit 430 when the error detection flag 502 indicates that no error has occurred. For example, the switch unit 420 outputs the MVC bitstream 501 to the MVC decoding unit 430 when the detected_error_flag parameter indicates 0.

The MVC decoding unit 430 is an example of a processing unit that executes the decoding method according to Embodiment 2 in the present invention, and decodes the MVC bitstream 501. More specifically, the MVC decoding unit 430 reads a reference image 503 from the memory unit 440, generates a prediction image using the read reference image 503, and decodes a random accessible picture included in the MVC bitstream 501 using the generated prediction image. A reconstructed image 504 generated through decoding is stored in the memory unit 440 as well as being outputted outside the decoding apparatus 400. The detailed configuration of the MVC decoding unit 430 will be described later.

The memory unit 440 is a memory for storing the reconstructed image 504. The memory unit 440 may store only images that are probably referenced to in the following processes, from among the reconstructed images 504 generated by the MVC decoding unit 430.

The error concealment unit 450 performs error concealment processes for concealing an error occurring in a compressed non-base view component. For example, the error concealment unit 450 reads a reconstructed base view component 505 from the memory unit 440, and outputs the read reconstructed base view component 505 as a reconstructured image 506 of the non-base view component. The base view component 505 is included in an access unit including the non-base view component in which an error has occurred.

The error concealment processes performed by the error concealment unit 450 are not limited to these, and may be processes of generating an error concealment image by motion prediction and motion compensation using ether images, and outputting the generated error concealment image as the reconstructured image 506.

Here, the operations by the processing units of the decoding apparatus 400 in FIG. 10 will be simply described with a data flow. First, the error detecting unit 410 reads the MVC bitstream 501, and outputs the detected_error_flag parameter that is an example of the error detection flag 502.

The switch unit 420 reads the detected_error_flag parameter from the error detecting unit 410. When the detected_error_flag parameter indicates 0, the switch unit 420 outputs a coded view component included in the MVC bitstream 501 to the MVC decoding unit 430. The MVC decoding unit 430 reads the coded view component, and the reference image 503 from the memory unit 440, and outputs the reconstructed image 504. The reconstructed image 504 is later stored in the memory unit 440.

When the detected_error_flag parameter indicates 1, the switch unit 420 transmits a non-base view component included in the MVC bitstream 501 to the error concealment unit 450. The error concealment unit 450 reads the reconstructed base view component 505 and a coded non-base view component, and outputs the error concealed image as the reconstructured image 506. One example of the error concealment methods used by the error concealment unit 450 is to duplicate the reconstructed base view and outputs the duplicated image as an image of the non-base view.

Figure 11:
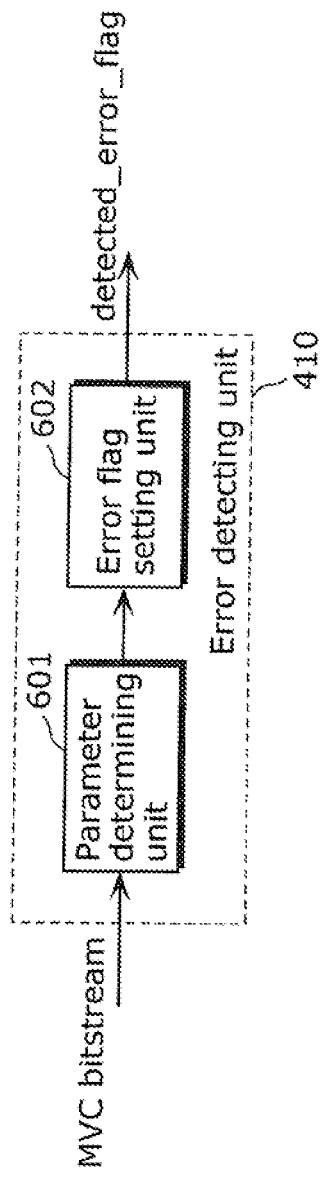
FIG. 11 is a block diagram illustrating an example of a configuration of an error detecting unit according to Embodiment 2 in the present invention.

Next, the error detecting unit 410 that executes the error detection method according to Embodiment 2 in the present invention will be described with reference to FIG. 11. FIG. 11 is a block diagram illustrating an example of a configuration of the error detecting unit 410 according to Embodiment 2 in the present invention.

As illustrated in FIG. 11, the error detecting unit 410 includes a parameter determining unit 601 and an error flag setting unit 602.

The parameter determining unit 601 reads, from a slice header, at least one parameter included in a modification syntax for modifying a reference picture list, and determines whether or not an error has occurred in the read parameter. More specifically, the parameter determining unit 601 performs at least one of the first to third determination processes to be described below.

The first determination process is to read the ref_pic_list_modification_flag_l0 parameter from a slice header as a parameter and determine whether or not the ref_pic_list_modification_flag_l0 parameter is a value (for example 1) indicating that a reference picture list is modified. In the first determination process, it is determined that an error has occurred except in the case where the ref_pic_list_modification_flag_l0 parameter is a value (for example, 1) indicating that a reference picture list is modified.

The second determination process is to read the modification_of_pic_nums_idc parameter from a slice header as a parameter and determine whether or not the read modification_of_pic_nums_idc parameter is a value indicating that the abs_diff_view_idx_minus1 parameter is a value corresponding to a value to be added to a prediction value of an inter-view reference index. In the second determination process, it is determined that an error has occurred except in the case where the modification_of_pic_nums_idc parameter indicates a value (for example, 5) indicating that the abs_diff_view_idx_minus1 parameter is the value corresponding to the value to be added to the prediction value.

The third determination process is to read the abs_diff_view_idx_minus1 parameter from a slice header as a parameter and determine whether or not the read abs_diff_view_idx_minus1 parameter indicates 0. In the third determination process, it is determined that an error has occurred except in the case where the abs_diff_view_idx_minus1 parameter indicates 0.

As illustrated in FIGS. 7A and 7B, the ref_pic_list_modification_flag_l0 parameter, modification_of_pic_nums_idc parameter, and abs_diff_view_idx_minus1 parameter are written in the slice header in consecutive order. Thus, the parameter determining unit 601 performs the first to third determination processes in consecutive order, more specifically, until it is determined in any one of the processes that an error has occurred.

The error flag setting unit 602 first sets, to the detected_error_flag parameter, a value indicating that no error has occurred in a random accessible picture as a initial process on an error detection flag. Furthermore, when the parameter determining unit 601 determines that the error has occurred, the error flag setting unit 602 sets, to the detected_error_flag parameter, a value (for example, 1) indicating that an error has occurred in a random accessible picture.

Figure 12:
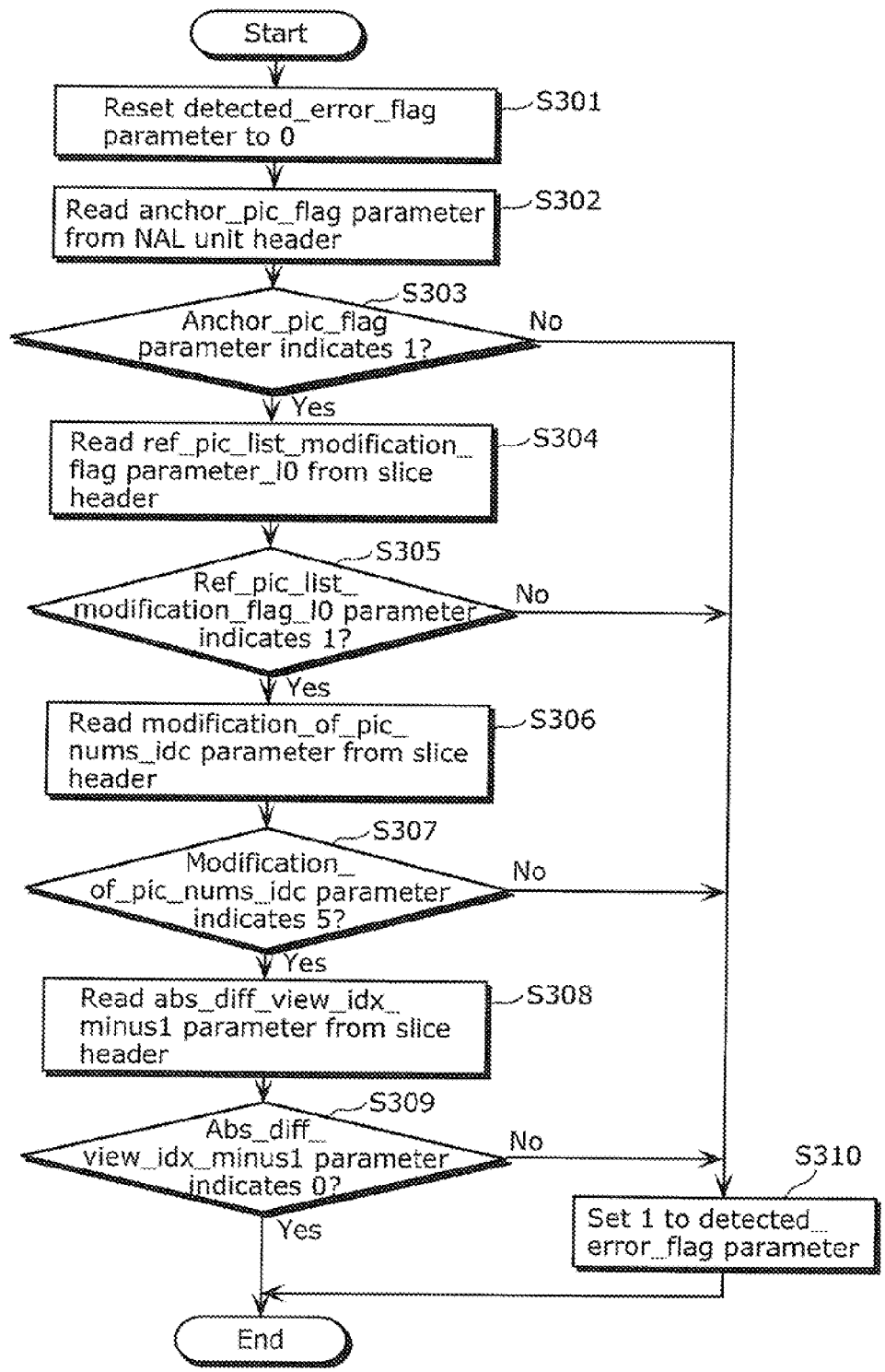
FIG. 12 is a flowchart showing an example of processes of detecting an error in a non-base view component in an anchor access unit according to Embodiment 2 in the present invention.

Next, an example of operations of the error detecting unit 410 that executes the error detection method according to Embodiment 2 in the present invention will be described with reference to FIG. 12. FIG. 12 illustrates an example of processes of detecting an error in a non-base view component in an anchor access unit according to Embodiment 2 in the present invention.

First, the error flag setting unit 602 sets 0 to the detected_error_flag parameter for the initialization (S301). The parameter is used for indicating whether or not a non-base view component has an error. In other words, as described above, the parameter indicating 1 shows that the non-base view component has a certain error. Otherwise, the detected_error_flag parameter indicating 0 shows that the non-base view component has no error.

Next, the parameter determining unit 601 reads the anchor_pic_flag parameter from a NAL unit header (S302). Then, the parameter determining unit 601 determines whether or not the read anchor_pic_flag parameter indicates 1 (S303). In other words, the parameter determining unit 601 determines whether or not a non-base view component is an anchor picture.

When the non-base view component in an anchor access unit does not indicate 1 (No at S303), that is, when the non-base view component is not an anchor picture, the error flag setting unit 602 sets 1 to the detected_error_flag parameter (S310).

When the anchor_pic_flag parameter of the non-base view component in an anchor access unit indicates 1 (Yes at S303), that is, when the non-base view component is an anchor picture, the parameter determining unit 601 reads the ref_pic_list_modification_flag_l0 parameter from a slice header (S304). The position of the ref_pic_list_modification_flag_l0 parameter is as illustrated in FIGS. 7A and 7B.

Then, the parameter determining unit 601 determines whether or not the read ref_pic_list_modification_flag_l0 parameter indicates 1 (S305). In other words, the parameter determining unit 601 determines whether or not a reference picture list is modified for a non-base view component in an anchor access unit.

When the ref_pic_list_modification_flag_l0 parameter does not indicate 1 (No at S305), that is, when the reference picture list is not modified, the error flag setting unit 602 sets 1 to the detected_error_flag parameter (S310).

When the ref_pic_list_modification_flag_l0 parameter indicates 1 (Yes at S305), that is, when the reference picture list has been modified, the parameter determining unit 601 reads the modification_of_pic_nums_idc parameter from a slice header (S306). The position of the modification_of_pic_nums_idc parameter is as illustrated in FIGS. 7A and 7B.

Then, the parameter determining unit 601 determines whether or not the read modification_of_pic_nums_idc parameter indicates 5 (S307). In other words, the parameter determining unit 601 determines whether or not the modification_of_pic_nums_idc parameter is a value indicating that the abs_diff_view_idx_minus1 parameter is a value corresponding to a value to be added to a prediction value of an inter-view reference index.

When the modification_of_pic_nums_idc parameter does not indicate 5 (No at S307), that is, when the modification_of_pic_nums_idc parameter is not the value indicating that the abs_diff_view_idx_minus1 parameter is the value corresponding to the value to be added to the prediction value, the error flag setting unit 602 sets 1 to the detected_error_flag parameter (S310).

When the modification_of_pic_nums_idc parameter indicates 5 (Yes at S307), that is, when the modification_of_pic_nums_idc parameter is a value indicating that the abs_diff_view_idx_minus1 parameter is the value corresponding to the value to be added to the prediction value, the parameter determining unit 601 reads the abs_diff_view_idx_minus1 parameter from the slice header (S308). Furthermore, the ref_pic_list_modification_flag_l0 parameter, the modification_of_pic_nums_idc parameter, and the abs_diff_view_idx_minus1 parameter are in consecutive order in each slice header as illustrated in FIGS. 7A and 7B.

Finally, the parameter determining unit 601 determines whether or not the abs_diff_view_idx_minus1 parameter indicates 0 (S309).

When the abs_diff_view_idx_minus1 parameter does not indicate 0 (No at S309), the error flag setting unit 602 sets 1 to the detected_error_flag parameter (S310). When the abs_diff_view_idx_minus1 parameter indicates 0 (Yes at S309), the error flag setting unit 602 outputs, to the switch unit 420, the detected_error_flag parameter as still 0.

As described above, the error detecting unit 410 according to Embodiment 2 in the present invention can determine whether or not a coded random accessible picture is correctly coded by modifying the reference picture list so that an inter-view reference picture is placed at the beginning of the reference picture list.

Next, a configuration of the MVC decoding unit 430 that executes the decoding method according to Embodiment 2 in the present invention will be described.

Figure 13:
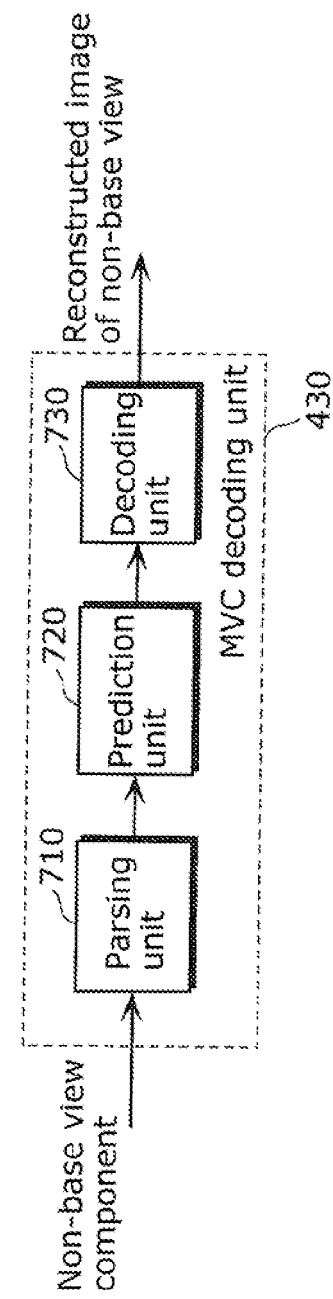
FIG. 13 is a block diagram illustrating an example of a configuration of an MVC decoding unit according to Embodiment 2 in the present invention.

FIG. 13 is a block diagram illustrating an example of a configuration of the MVC decoding unit 430 according to Embodiment 2 in the present invention. The MVC decoding unit 430 includes a parsing unit 710, a prediction unit 720, and a decoding unit 730.

The parsing unit 710 parses a slice header to determine whether or not a reference picture list has been modified. More specifically, the parsing unit 710 determines whether or not a reference picture list has been modified when an image to be decoded is an image included in a random accessible picture and included in a non-base view component.

The prediction unit 720 generates a prediction image in accordance with a predetermine standard, when the parsing unit 710 determines that the reference picture list has been modified. For example, the prediction unit 720 generates a prediction image in accordance with the video standard H.264/MPEG-4 AVC Multiview Video Coding (MVC), when the parsing unit 710 determines that the reference picture list has been modified.

Furthermore, the prediction unit 720 generates a prediction image according to a method different from the standard, when the parsing unit 710 determine that the reference picture list has not been modified. For example, the prediction unit 720 generates a prediction image using, as a reference image, a base view component included in an access unit including an image of a non-base view component to be decoded.

The decoding unit 730 decodes the image that is included in the non-base view component and is an image of a random accessible picture, based on the prediction image generated by the prediction unit 720.

The following will describe the detailed configuration of the MVC decoding unit 430.

Figure 14:
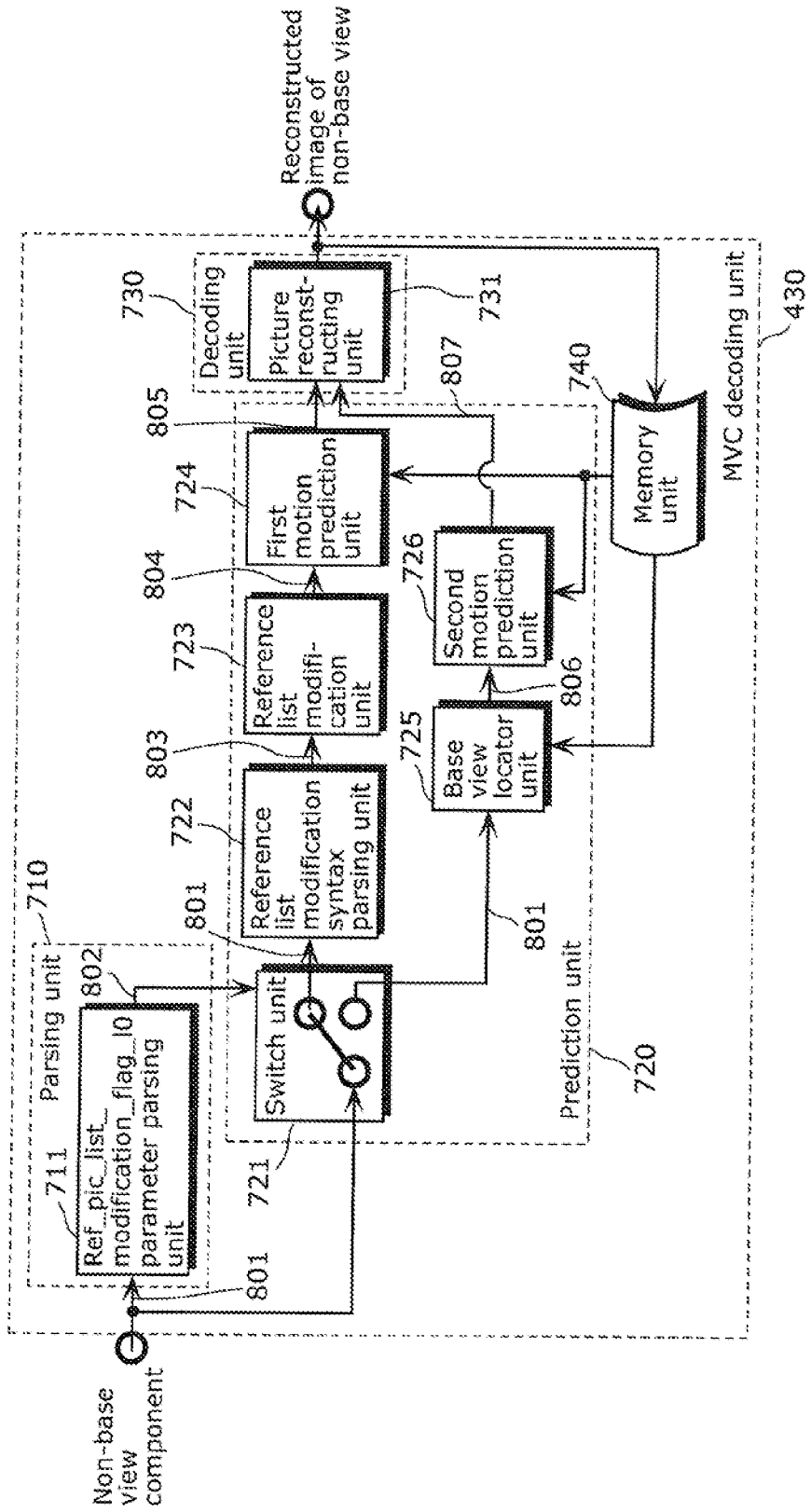
FIG. 14 is a block diagram illustrating an example of a configuration of an MVC decoding unit according to Embodiment 2 in the present invention.

FIG. 14 is a block diagram illustrating an example of a configuration of the MVC decoding unit 430 according to Embodiment 2 in the present invention. As illustrated in FIG. 14, the MVC decoding unit 430 includes the parsing unit 710, the prediction unit 720, the decoding unit 730, and a memory unit 740.

As illustrated in FIG. 14, the parsing unit 710 includes a ref_pic_list_modification_flag_l0 parameter parsing unit 711. Furthermore, the prediction unit 720 includes a switch unit 721, a reference list modification syntax parsing unit 722, a reference list modification unit 723, a first motion prediction unit 724, a base view locator unit 725, and a second motion prediction unit 726. Furthermore, the decoding unit 730 includes a picture reconstructing unit 731.

The ref_pic_list_modification_flag_l0 parameter parsing unit 711 reads a slice header of a non-base view component 801 in an anchor access unit, and outputs a value of a ref_pic_list_modification_flag_l0 parameter 802 to the switch unit 721.

When the ref_pic_list_modification_flag_l0 parameter indicates 1, the switch unit 721 transmits the non-base view component 801 to the reference list modification syntax parsing unit 722. Furthermore, when the ref_pic_list_modification_flag_l0 parameter indicates 0, the switch unit 721 transmits the non-base view component 801 to the base view locator unit 725.

The reference list modification syntax parsing unit 722 reads a slice header of the non-base view component 801, and outputs a reference list modification syntax 803 to the reference list modification unit 723.

The reference list modification unit 723 reads the reference list modification syntax 803, modifies a reference picture list based on the read reference list modification syntax 803, and outputs a modified reference picture list 804 to the first motion prediction unit 724.

The first motion prediction unit 724 uses the modified reference picture list for motion prediction, and outputs a prediction image 805 to the picture reconstructing unit 731.

The base view locator unit 725 locates a corresponding base view component 806 in the memory unit 740, and outputs the located base view component 806 to the second motion prediction unit 726.

The second motion prediction unit 726 uses the located base view component 806 for motion prediction, and outputs a prediction image 807 to the picture reconstructing unit 731.

The picture reconstructing unit 731 reads one of the prediction images 805 and 807, reconstructs a image of the non-base view, and outputs the reconstructed image of the non-base view.

As described above, the decoding apparatus 400 according to Embodiment 2 in the present invention can modify a reference picture list so that an inter-view reference picture is placed at the beginning of the reference picture list, and correctly decode a coded random accessible picture.

The following will describe the decoding apparatus 400 according to Embodiment 2 in the present invention.

Figure 15:
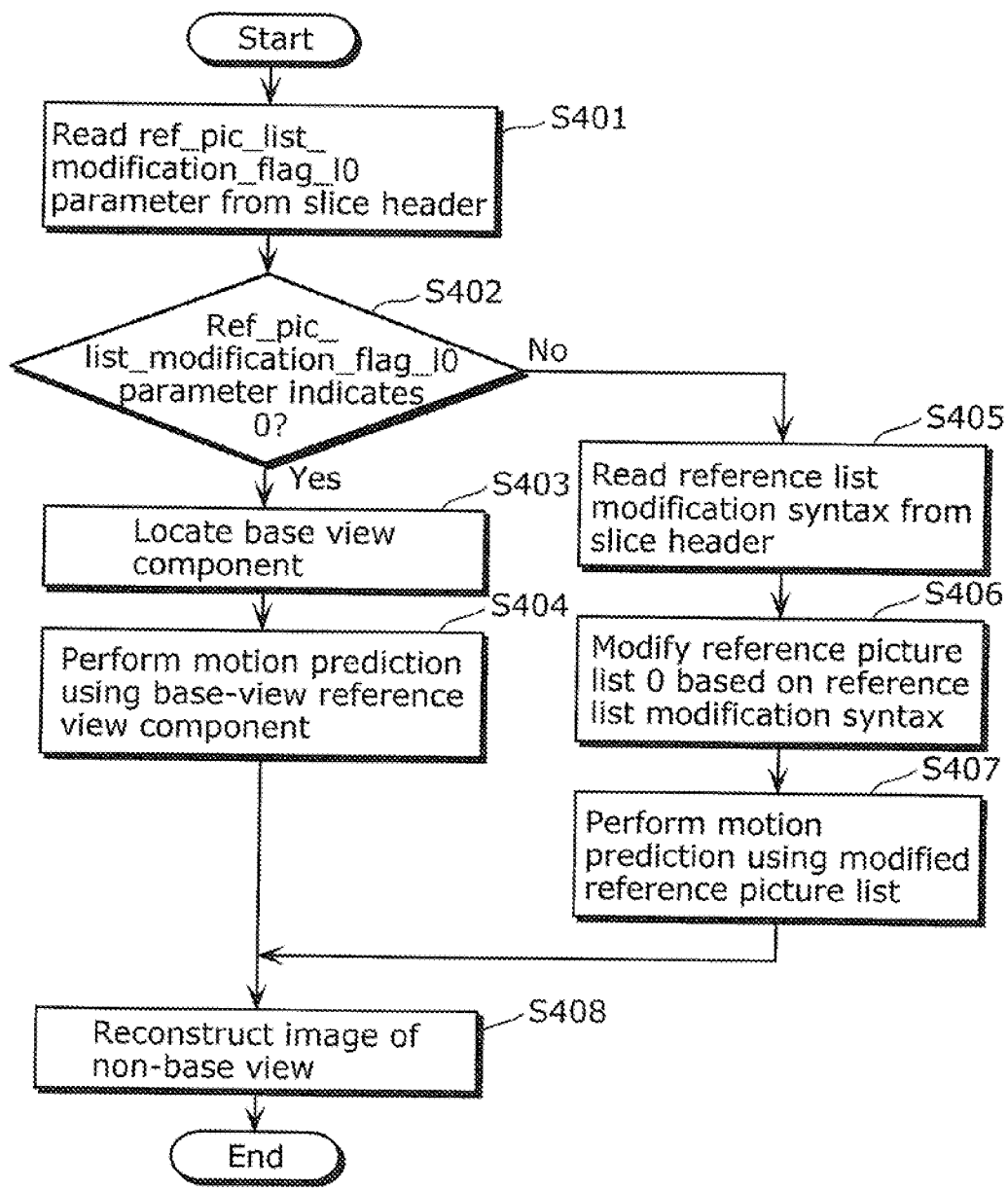
FIG. 15 is a flowchart showing an example of processes of decoding a non-base view component in an anchor access unit according to Embodiment 2 in the present invention.

FIG. 15 is a flowchart showing an example of processes of decoding a non-base view component in an anchor access unit according to Embodiment 2 in the present invention.

First, the parsing unit 710 reads a ref_pic_list_modification_flag_l0 parameter from a slice header (S401). Then, the parsing unit 710 determines whether or not the read ref_pic_list_modification_flag_l0 parameter indicates 0 (S402). In other words, the parsing unit 710 determines whether or not a reference picture list has been modified for a non-base view component in an anchor access unit.

When the ref_pic_list_modification_flag_l0 parameter indicates 0 (Yes at S402), that is, when the reference picture list has not been modified, the base view locator unit 725 locates a base view component in an anchor picture held in the memory unit 740 (S403). The base view component in the anchor picture has a picture order count identical to that of a non-base view component that is being decoded. In other words, the base view locator unit 725 locates a base view component included in an access unit including the non-base view component.

Next, the second motion prediction unit 726 performs motion prediction using the located base view component (S404). In the coded non-base view component, a reference index for identifying which reference picture in a reference list is to be used for motion prediction is sometimes assigned to a macroblock header. However, the second motion prediction unit 726 selects the located base view component (image of a base view) as a reference picture for motion prediction without reference to such a reference index.

Furthermore, when the ref_pic_list_modification_flag_l0 parameter does not indicate 0 (No at S402), that is, when the reference picture list has been modified, the reference list modification syntax parsing unit 722 reads a reference list modification syntax from the slice header (S405). Then, the reference list modification unit 723 modifies the reference picture list based on the read reference list modification syntax (S406). More specifically, as illustrated in FIG. 6, the reference list modification unit 723 modifies the reference picture list so that an inter-view reference picture is placed at the beginning of the reference picture list. Next, the first motion prediction unit 724 performs motion prediction using the modified reference picture list (S407).

Finally, after the motion prediction, the picture reconstructing unit 731 reconstructs an image of the non-base view (S408).

As described above, the decoding apparatus 400 according to Embodiment 2 in the present invention determines whether or not an error has occurred in a syntax indicating that a reference picture list included in a coded stream has been modified, when decoding a random accessible picture coded based on the modified reference picture list, for example, a coded anchor picture. Furthermore, the decoding apparatus 400 modifies a reference picture list based on a syntax read from a coded stream, and decodes the random accessible picture coded based on the modified reference picture list, for example, the coded anchor picture, using the modified reference picture list.

Thereby, the decoding apparatus 400 can not only detect the error in the random accessible picture coded using the modified reference picture list but also correctly decode the picture.

The decoding apparatus 400 according to Embodiment 2 in the present invention does not have to include the error detecting unit 410. More specifically, with mere inclusion of the MVC decoding unit 430, the decoding apparatus 400 in the present invention can decode the coded random accessible picture using the modified reference picture list.

Furthermore, the error detecting unit 410 according to Embodiment 2 in the present invention does not have to be included in the decoding apparatus 400. The error detecting unit 410 can be implemented as an error detecting apparatus independent from a coding apparatus and a decoding apparatus. Furthermore, the coding apparatus may include the error detecting unit 410 in order to verify that the coding has been correctly performed.

Furthermore, as a variation of the decoding apparatus and the decoding method according to the present invention, when an image to be decoded is a random accessible picture, the base view component included in an access unit including the image to be decoded may be used as a reference image, regardless of the value of the reference index.

Figure 16:
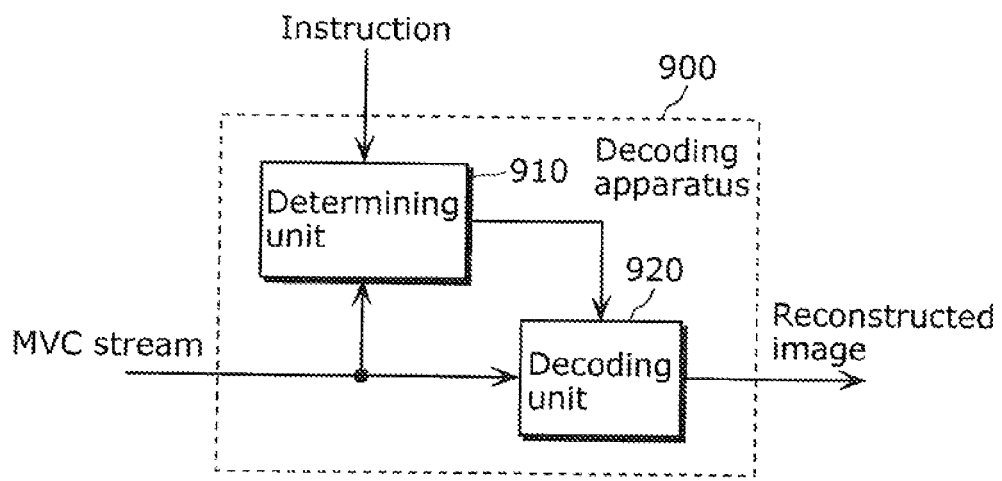
FIG. 16 is a block diagram illustrating an example of a configuration of a decoding apparatus according to a variation in the present invention.

FIG. 16 is a block diagram illustrating an example of a configuration of a decoding apparatus 900 according to a variation in the present invention. As illustrated in FIG. 16, the decoding apparatus 900 includes a determining unit 910 and a decoding unit 920.

The determining unit 910 determines whether or not to perform a random access. More specifically, the determining unit 910 determines whether or not to have received an instruction for starting a random access from a user, and determines to perform the random access upon receipt of the instruction. Alternatively, the determining unit 910 may determine whether or not a first base view image from which the decoding starts is an image included in an I-picture. When the first base view image is the image included in the I-picture, the determining unit 910 determines to perform the random access.

When the determining unit 910 determines to perform the random access, the decoding unit 920 decodes a non-base view component in an access unit including a first random accessible picture, using a base view component in the same access unit as a reference image regardless of the reference indexes. Furthermore, the decoding unit 920 may decode the non-base view component by prohibiting a base view component in an access unit different from the access unit including the first random accessible picture from being used as the reference image, and using, as the reference image, only the base view component included in the access unit including the first random accessible picture.

Figure 17:
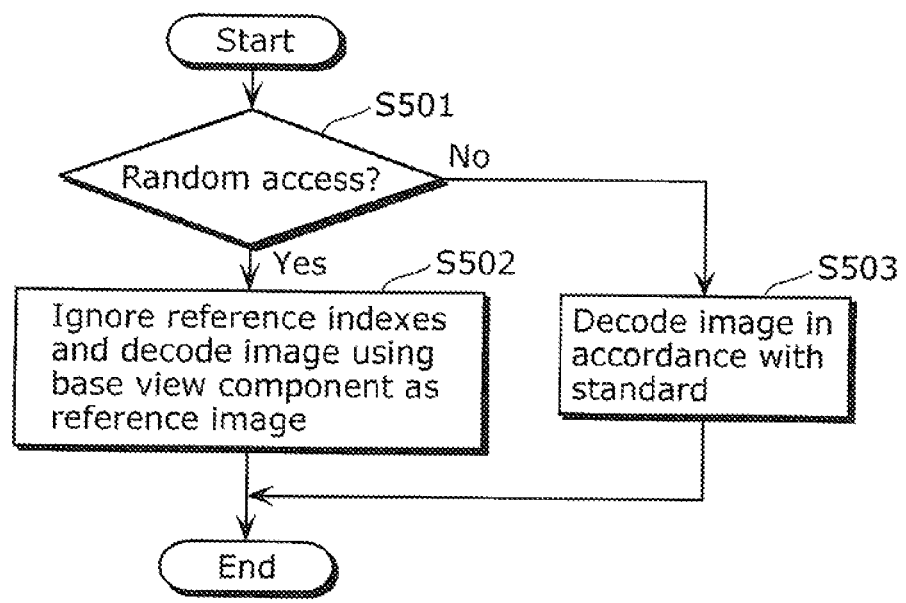
FIG. 17 is a flowchart showing an example of operations of a decoding apparatus according to a variation in the present invention FIG. 18 schematically illustrates an overall configuration of a content providing system for implementing content distribution services.

Operations of the decoding apparatus 900 according to the variation in the present invention will be described with reference to FIG. 17. FIG. 17 is a flowchart showing an example of the operations of the decoding apparatus 900 according to the variation in the present invention.

First, the determining unit 910 determines whether or not to perform a random access (S501). For example, the determining unit 910 determines whether or not to have received an instruction for starting a random access from the user, and determines to perform the random access upon receipt of the instruction. Furthermore, the determining unit 910 may determine whether or not a base view component to be referenced to by an image to be decoded is an I-picture, and determine to perform the random access when the base view component is the I-picture. Here, the image to be decoded is included in a non-base view component.

When the determining unit 910 determines to perform the random access (Yes at S501), the decoding unit 920 ignores reference indexes, and decodes the image to be decoded of the non-base view component, using the base view component as a reference image (S502).

When the determining unit 910 does not determine to perform the random access (No at S501), the decoding unit 920 decodes the image to be decoded in accordance with the video standard H.264/MPEG-4 AVC MVC (S503).

As described above, the decoding apparatus 900 according to the variation in the present invention includes the determining unit 910 that determines whether or not to perform a random access. When the random access is performed, the decoding unit 920 decodes a non-base view component, using a base view component in the same access unit as a reference image regardless of values of the reference indexes. Thereby, even when the reference indexes are assigned to reference pictures in any order in the coding apparatus, the decoding apparatus 900 can decode a coded random accessible picture.

Furthermore, the decoding apparatus 900 according to the variation in the present invention may include: a decoding start picture designating unit configured to designate a decoding start picture; a determining unit configured to determine that a random access has started when a picture of a base view that is the decoding start picture designated by the decoding start picture designating unit is an I-picture; and a decoding unit configured, when the determining unit determines that the random access has started, to prohibit reference of a picture of a base view in a first random access unit different from a second random access unit including the I-picture when decoding a non-base view in the second random access unit, and to decode the non-base view only with reference to the picture of the base view in the second random access unit.

(Embodiment 3)

The processing described in Embodiments 1 and 2 can be simply implemented by recording, in a recording medium, a program for implementing the configurations for the image coding method and the image decoding method described in Embodiments 1 and 2. The recording medium may be any recording medium as long as the program can be recorded, such as a magnetic disk, an optical disk, a magnetic optical disk, an IC card, and a semiconductor memory.

Hereinafter, the applications to the image coding method and the image decoding method described in Embodiments 1 and 2 and systems using thereof will be described.

Figure 18:
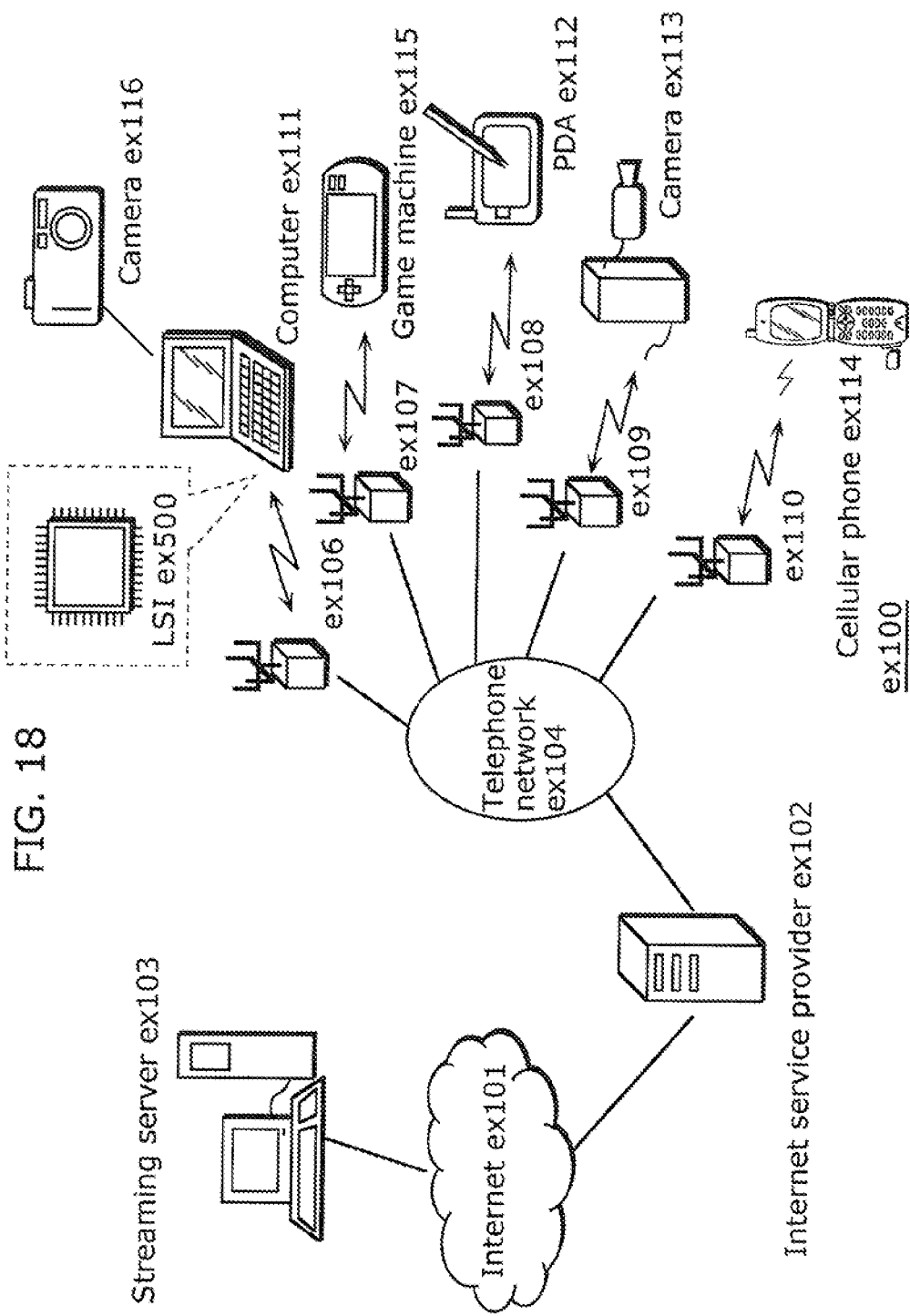

FIG. 18 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 18, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiments 1 and 2, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by a Large Scale Integration (LSI) ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding method and the image decoding method described in Embodiments 1 and 2 may be used.

The cellular phone ex114 will be described as an example of such a device.

Figure 19:
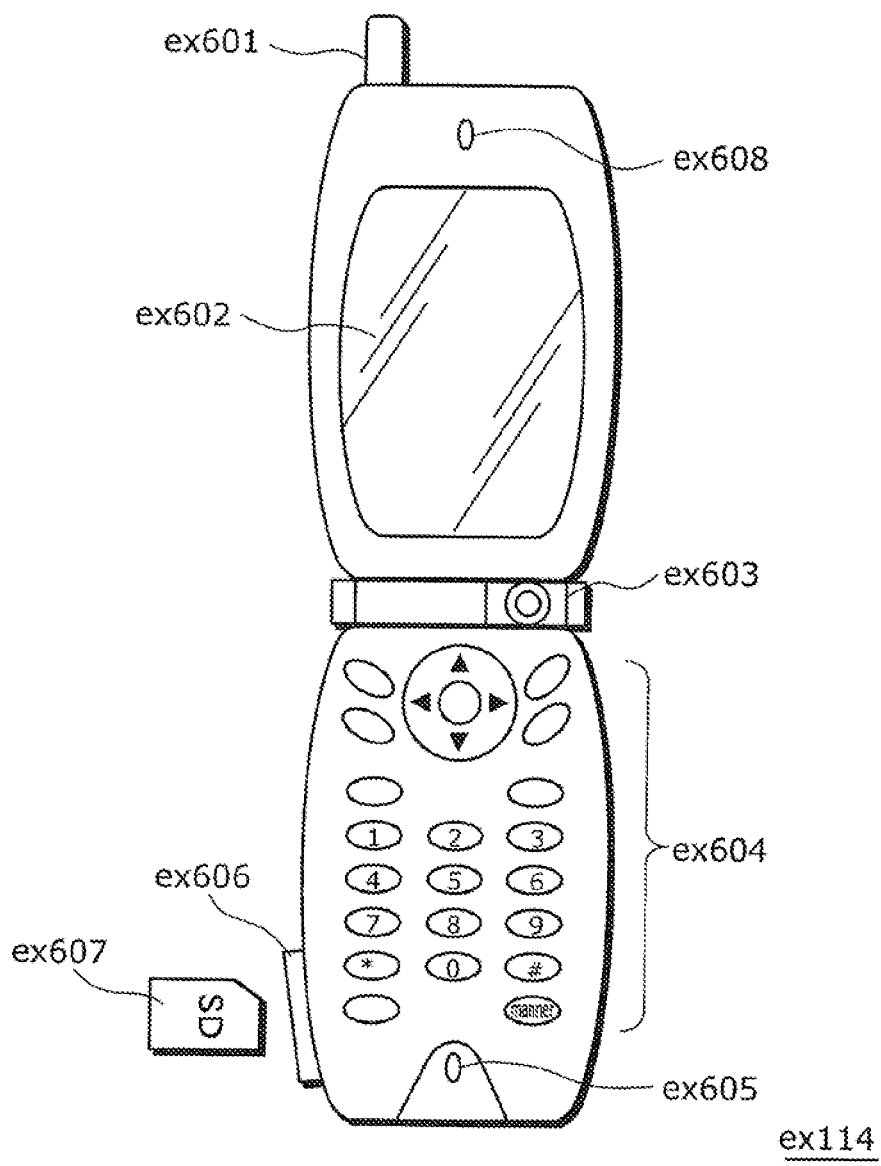
FIG. 19 illustrates an external view of a cellular phone.

FIG. 19 illustrates the cellular phone ex114 that uses the image coding method and the image decoding method described in Embodiments 1 and 2. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a nonvolatile memory that is electrically rewritable and erasable.

Figure 20:
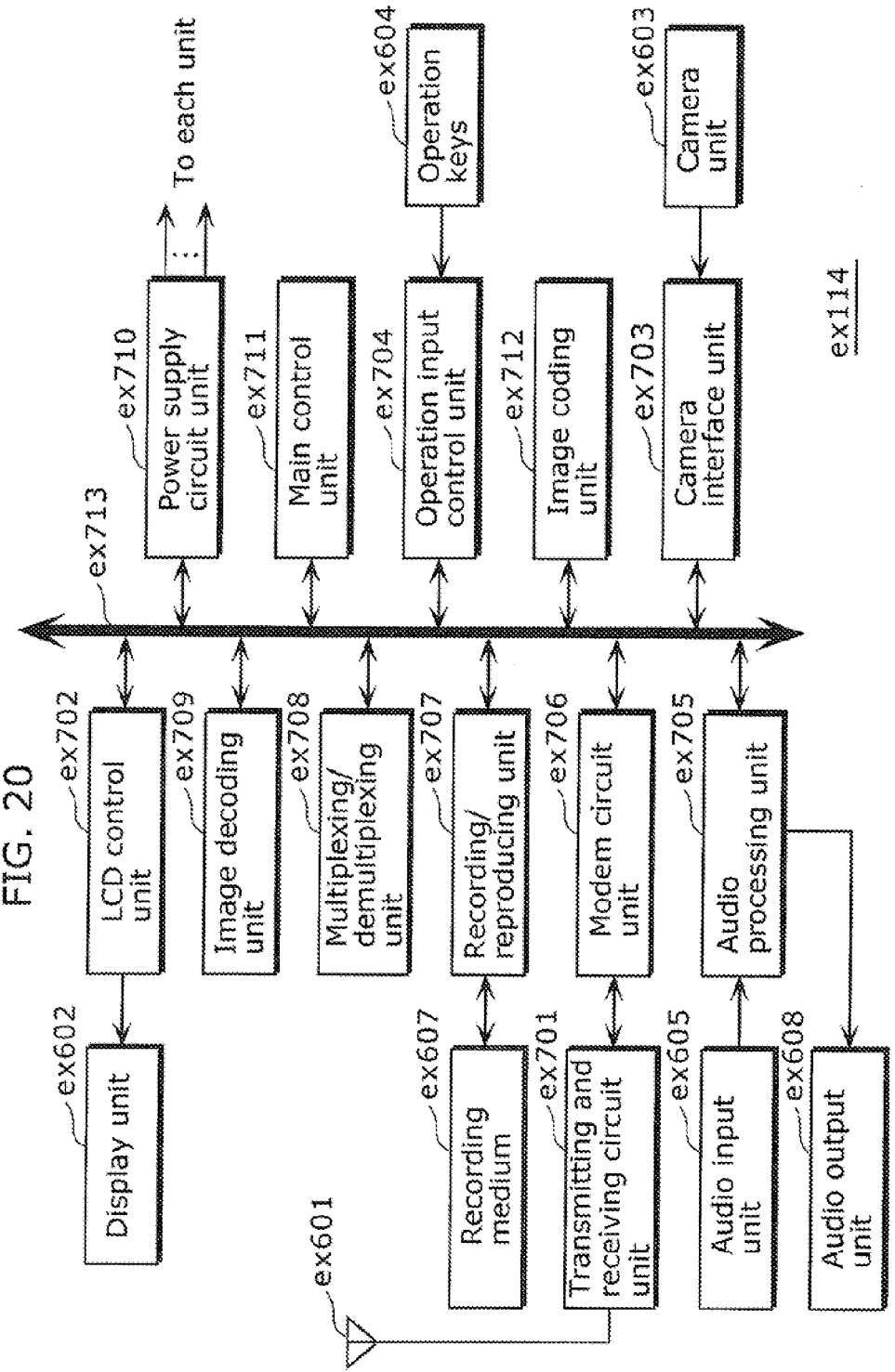
FIG. 20 is a block diagram illustrating an example of a configuration of a cellular phone.

Next, the cellular phone ex114 will be described with reference to FIG. 20. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. Furthermore, when the image data is not transmitted, the image data captured by the camera unit ex603 can be displayed directly on the display unit ex602 via the camera interface unit ex703 and the LCD control unit ex702.

The image coding unit ex712 including the image coding apparatus as described for the present invention compress-codes the image data supplied from the camera unit ex603 using the coding method employed by the image coding apparatus as shown in Embodiments 1 and 2 so as to transform the data into coded image data, and sends the data out to the multiplexing/demultiplexing unit ex708. Furthermore, the cellular phone ex114 simultaneously sends out, as digital audio data, the audio collected by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bit stream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described for the present invention decodes the bit stream of the image data using the decoding method corresponding to the coding method as shown in Embodiments 1 and 2 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 21:
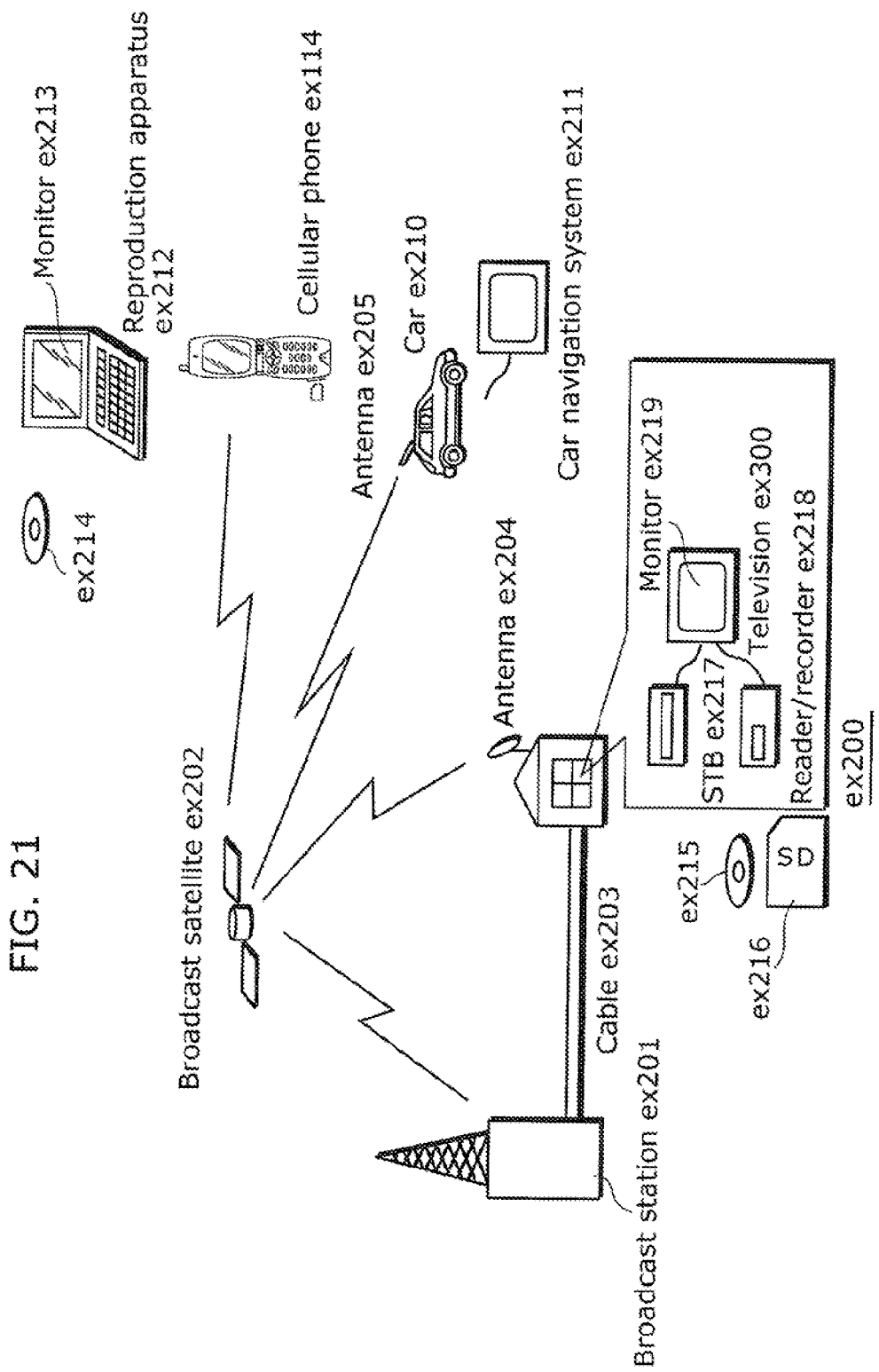
FIG. 21 schematically illustrates an example of an overall configuration of a digital broadcasting system.

The present invention is not limited to the above-mentioned system because terrestrial or satellite digital broadcasting has been in the news lately, and at least either the image coding apparatus or the image decoding apparatus described in Embodiments 1 and 2 can be incorporated into a digital broadcasting system as shown in FIG. 21. More specifically, a broadcast station ex201 communicates or transmits, via radio waves to a broadcast satellite ex202, audio data, video data, or a bit stream obtained by multiplexing the audio data and the video data. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217, decodes a coded bit stream and reproduces the decoded bit stream. Furthermore, a reader/recorder ex218 that reads and decodes such a bit stream obtained by multiplexing image data and audio data that are recorded on recording media ex215 and 216, such as a CD and a DVD may include the image decoding apparatus as shown in Embodiments 1 and 2. In this case, the reproduced video signals are displayed on a monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300.

Also, a car ex210 having an antenna ex205 can receive signals from the satellite ex202 or the base station ex201 for reproducing video on a display device such as a car navigation system ex211 set in the car ex210.

Furthermore, the image decoding apparatus or the image coding apparatus as shown in Embodiments 1 and 2 can be implemented in the reader/recorder ex218 (i) for reading and decoding the video data, the audio data, or the coded bit stream obtained by multiplexing the video data and the audio data, or (ii) for coding the video data, the audio data, or the coded bit stream obtained by multiplexing the video data and the audio data and recording the resulting data as the multiplexed data on a recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bit stream is recorded. For example, another reproduction apparatus ex212 can reproduce the video signals on a monitor ex213, using a recording medium ex214 on which the coded bit stream is copied.

Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 22:
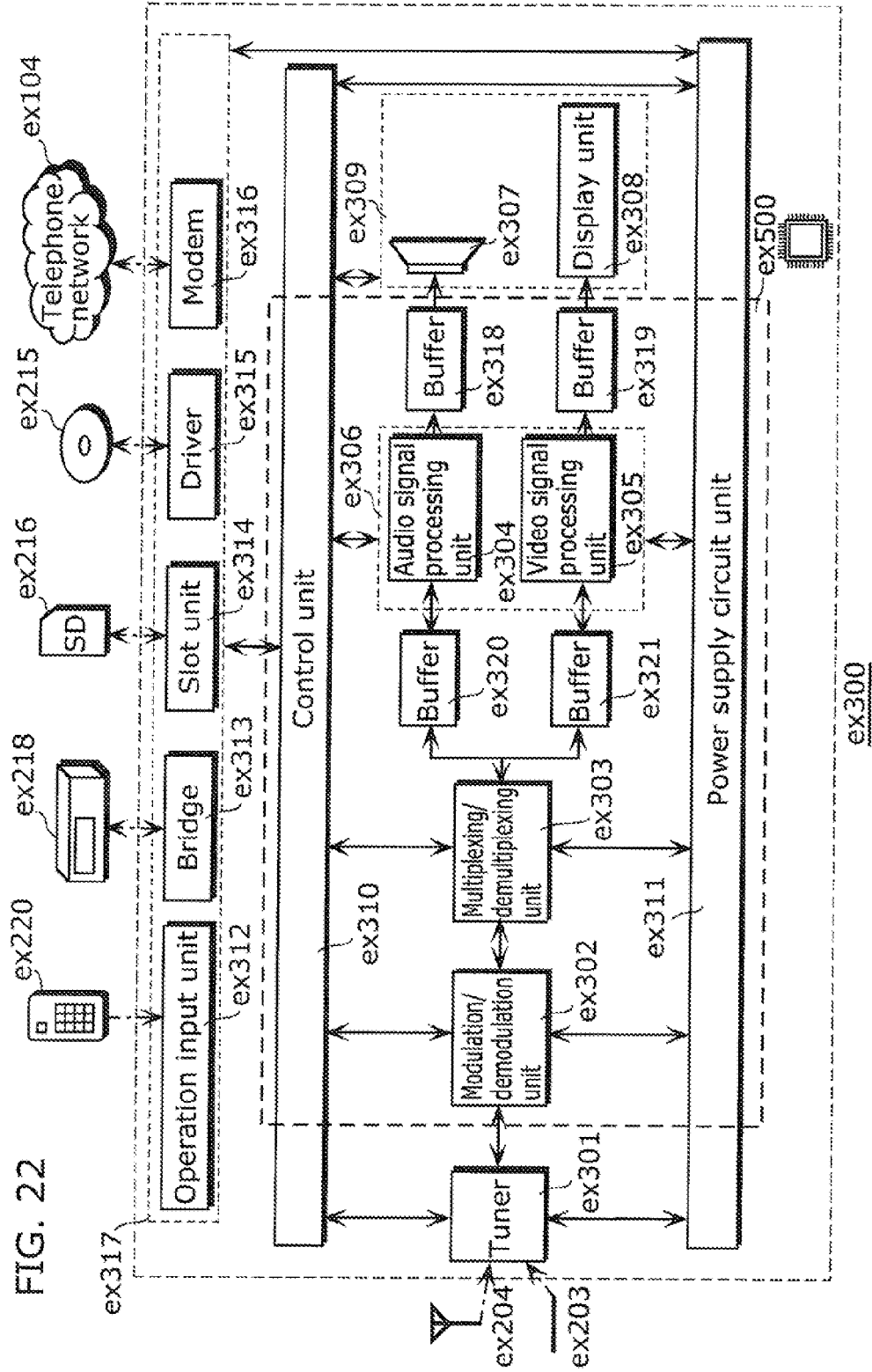
FIG. 22 is a block diagram illustrating an example of a configuration of a television.

FIG. 22 illustrates the television (receiver) ex300 that uses the image coding method and the image decoding method described in Embodiments 1 and 2. The television ex300 includes: a tuner ex301 that obtains or provides a bit stream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiments 1 and 2, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiments 1 and 2. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may not be capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 23:
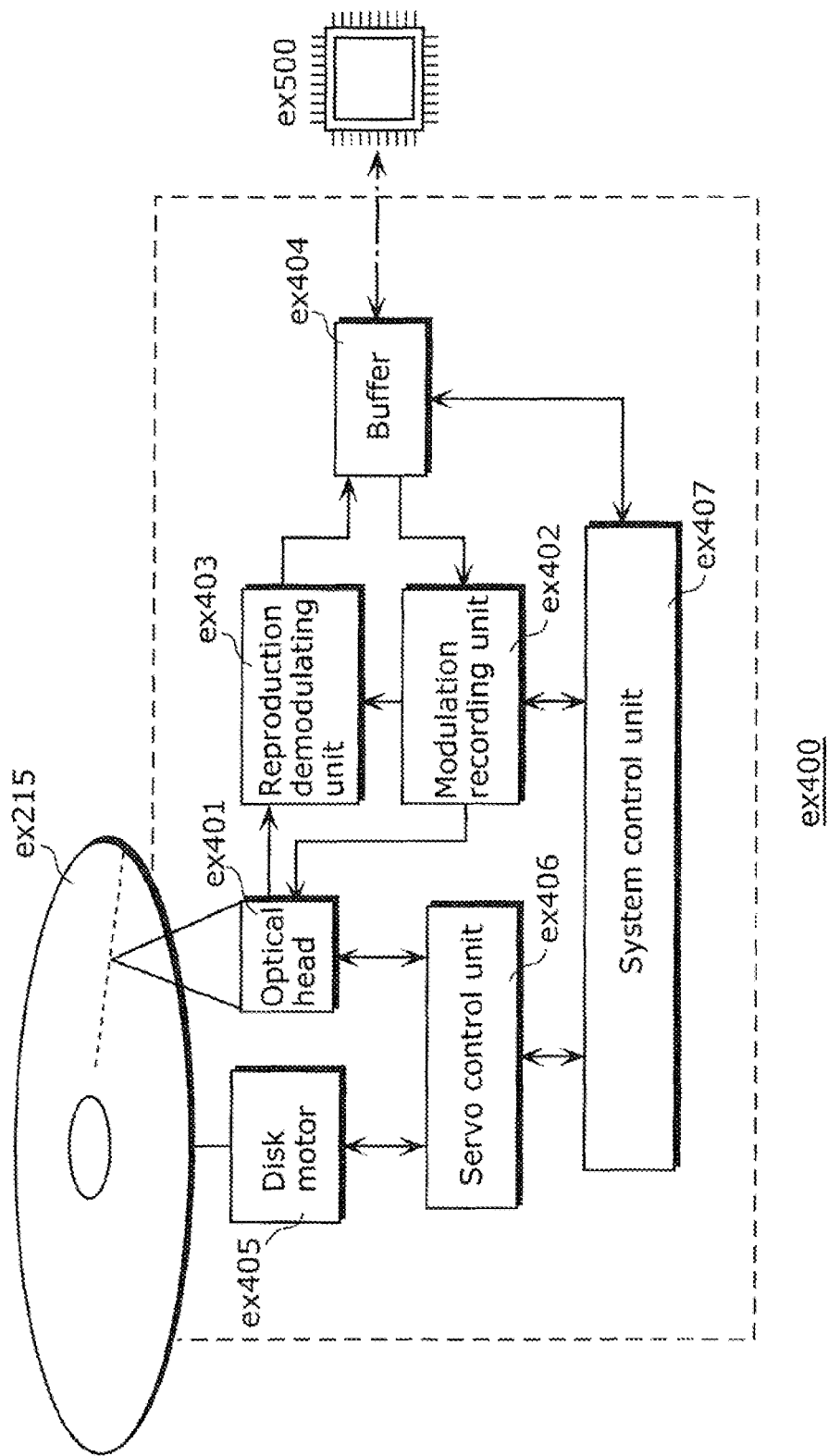
FIG. 23 is a block diagram illustrating an example of a configuration of an information reproducing/recording unit that reads and writes information from or on a recording medium that is an optical disk.

As an example, FIG. 23 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
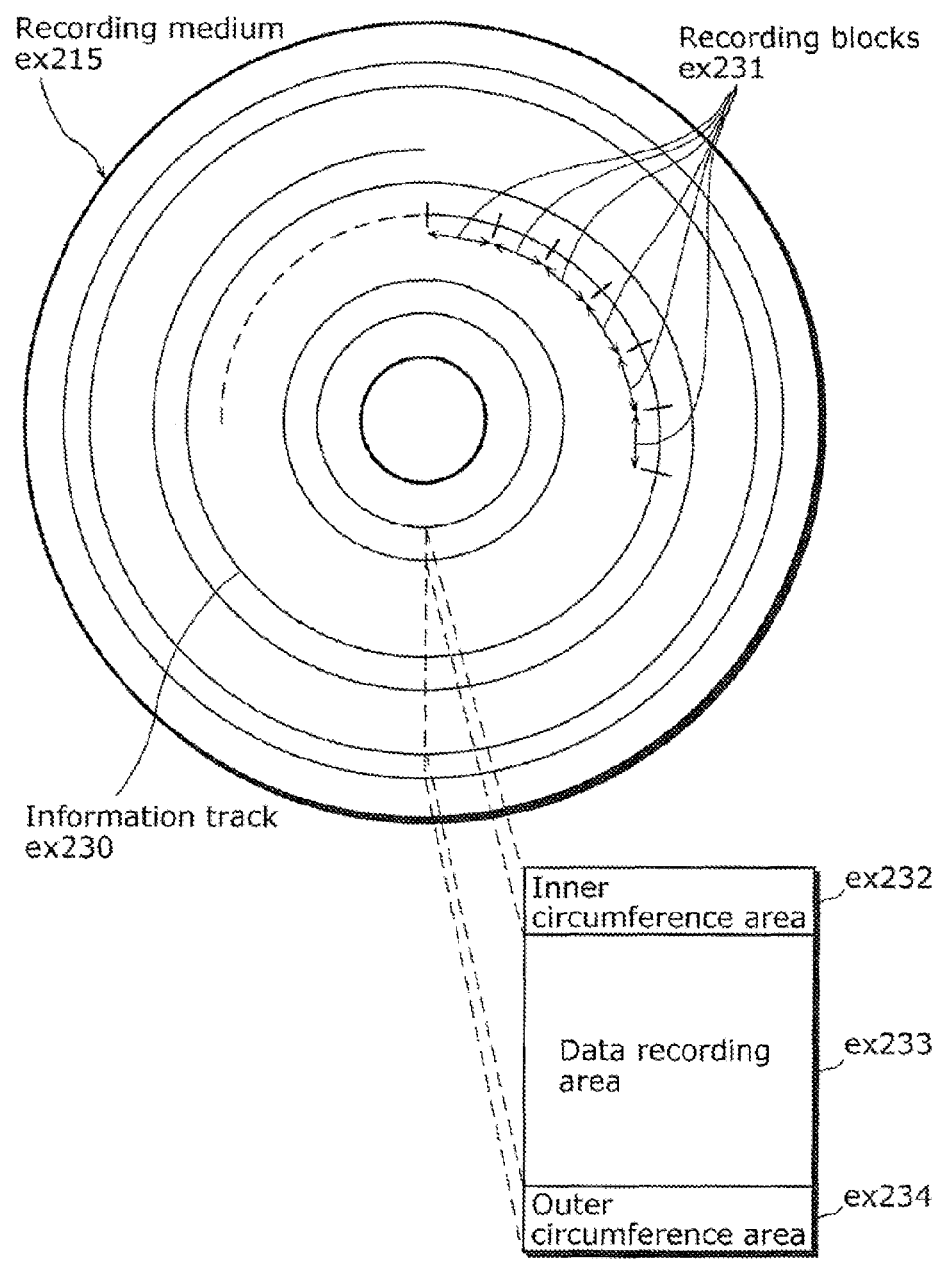
FIG. 24 illustrates an example of a configuration of a recording medium that is an optical disk.

FIG. 24 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit in the configuration illustrated in FIG. 22. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in Embodiments 1 and 2 can be used in any of the devices and systems described. Thus, the advantages described in Embodiments 1 and 2 can be obtained.

Furthermore, the present invention is not limited to Embodiments, and various modifications and revisions are possible without departing from the scope of the present invention.

(Embodiment 4)

Figure 25:
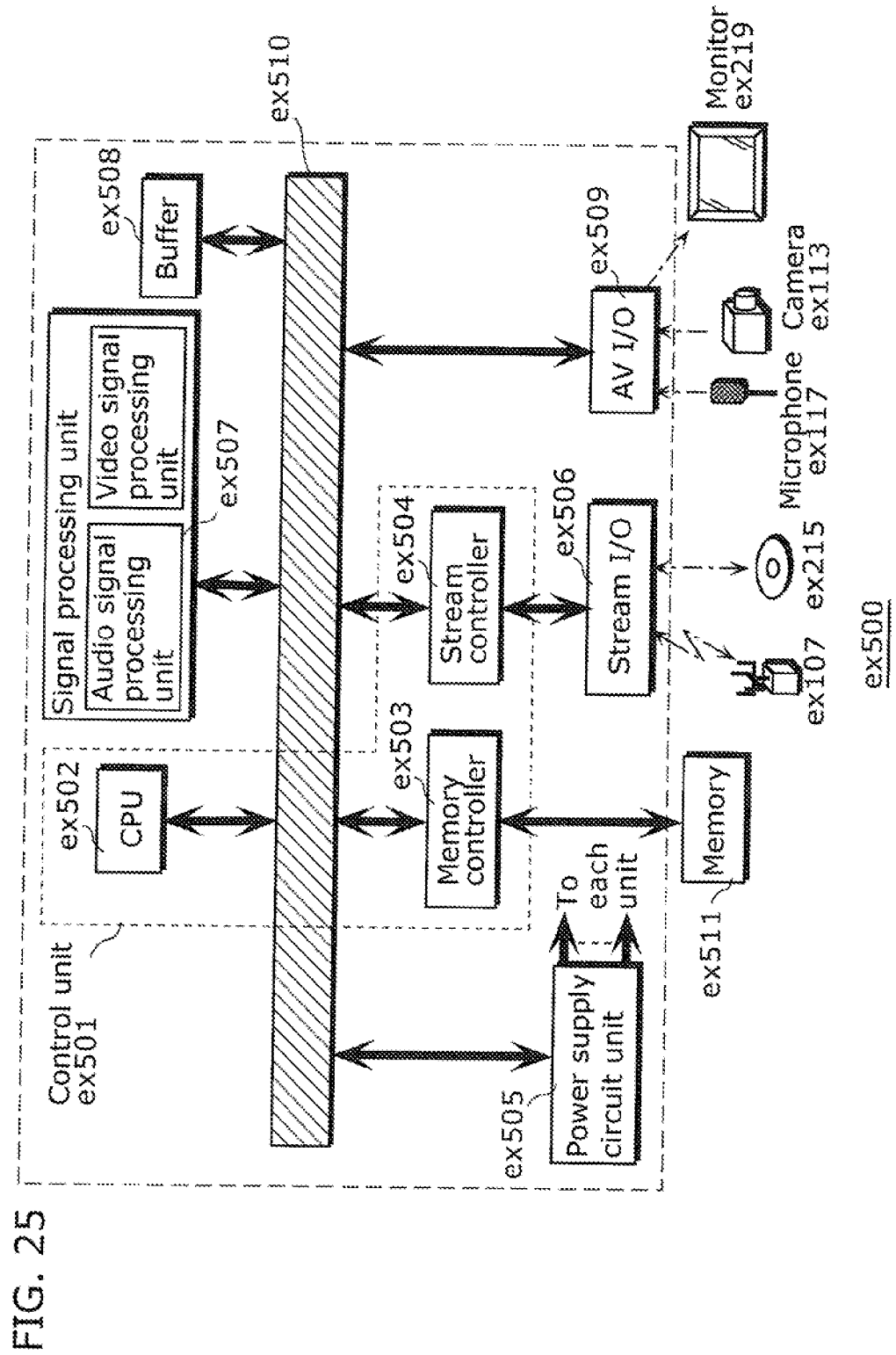
FIG. 25 is a block diagram illustrating an example of a configuration of an integrated circuit for implementing the image coding method and the image decoding method according to each of Embodiments.

Each of the image coding method, the image coding apparatus, the image decoding method, and the image decoding apparatus in each of Embodiments is typically achieved in the form of an integrated circuit or a Large Scale Integrated (LSI) circuit. As an example, FIG. 25 illustrates a configuration of an LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments 1 and 2. Furthermore, the signal processing unit ex507 sometimes multiplexes the coded audio data and the coded video data, and a stream I/O ex506 provides the multiplexed data outside. The provided bit stream is transmitted to a base station ex107, or written into the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to a signal processing unit ex507. The signal processing unit ex507 decodes audio data and/or video data. Here, the decoding of the video signal is the decoding described in Embodiments 1 and 2. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the coding method, the coding apparatus, the error detecting method, the error detecting apparatus, the decoding method, and the decoding apparatus in the present invention are described based on Embodiments, the present invention is not limited to Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

INDUSTRIAL APPLICABILITY

The present invention has an advantage of reducing the code amount necessary for coding the reference indexes and improving the coding efficiency, and is applicable to a coding apparatus that codes audio, still images, and moving images, and a decoding apparatus that decodes data coded by the coding apparatus. For example, the present invention is applicable to various audio visual systems, such as audio equipment, a cellular phone, a digital camera, a BD recorder, and a digital television.

REFERENCE SIGNS LIST

10 Access unit
20 View component
100 Coding apparatus
110 First view component coding unit
120, 440, 740 Memory unit
130 Second view component coding unit
201 Base view image
202 Compressed base view component
203 Reconstructed image
211 Non-base view image
212 Compressed non-base view component
213, 503 Reference image
301 Coding unit
302 Header writing unit
303 List modification unit
400, 900 Decoding apparatus
410 Error detecting unit
420, 721 Switch unit
430 MVC decoding unit
450 Error concealment unit
501 MVC bitstream
502 Error detection flag
504, 506 Reconstructed image
505 Reconstructured base view component
601 Parameter determining unit
602 Error flag setting unit
710 Parsing unit
711 Ref_pic_list_modification_flag_l0 parameter parsing unit
720 Prediction unit
722 Reference list modification syntax parsing unit
723 Reference list modification unit
724 First motion prediction unit
725 Base view locator unit
726 Second motion prediction unit
730, 920 Decoding unit
731 Picture reconstructing unit
801 Non-base view component
802 Ref_pic_list_modification_flag_l0 parameter
803 Reference list modification syntax
804 Reference picture list
805, 807 Prediction image
806 Base view component
910 Determining unit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116 Camera
ex114 Cellular phone equipped with camera (cellular phone)
ex115 Game machine
ex117 Microphone
ex200 Digital broadcasting system
ex201 Broadcast station
ex202 Broadcast satellite (satellite)
ex203 Cable
ex204, ex205, ex601 Antenna
ex210 Car
ex211 Car navigation system
ex212 Reproduction apparatus
ex213, ex219 Monitor
ex214, ex215, ex216, ex607 Recording medium
ex217 Set top box (STB)
ex218 Reader/recorder
ex220 Remote controller
ex230 Information track
ex231 Recording blocks
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit ex309 Output unit
ex310, ex501 Control unit
ex311, ex505, ex710 Power supply circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproducing/recording unit
ex401 Optical head
ex402 Modulation recording unit
ex403 Reproduction demodulating unit
ex405 Disk motor
ex406 Servo control unit
ex407 System control unit
ex500 LSI
ex502 CPU
ex503 Memory controller
ex504 Stream controller
ex506 Stream I/O
ex509 AV IO
ex510 Bus
ex603 Camera unit
ex604 Operation keys
ex605 Audio input unit
ex608 Audio output unit
ex701 Transmitting and receiving circuit unit
ex702 LCD control unit
ex703 Camera interface unit (camera I/F unit)
ex704 Operation input control unit
ex705 Audio processing unit
ex706 Modem circuit unit
ex707 Recording/reproducing unit
ex708 Multiplexing/demultiplexing unit
ex709 Image decoding unit
ex711 Main control unit
ex712 Image coding unit
ex713 Synchronous bus

The invention claimed is:

1. A coding method of coding a random accessible picture using inter-view reference, said coding method comprising:
writing, into a slice header of the random accessible picture, a first reference list modification syntax for modifying an order of one or more reference pictures included in a first reference picture list, the one or more reference pictures being able to be referred to by the random accessible picture;
placing an inter-view reference picture among the one or more reference pictures at the beginning of the first reference picture list; and
coding a current slice included in the random accessible picture, using the inter-view reference picture placed at the beginning of the first reference picture list,
wherein said writing of a first reference list modification syntax includes:
setting a value indicating that the first reference picture list is modified, to a Ref_pic_list_modification_flag_l0 parameter;
writing the ref_pic_list_modification_flag_l0 parameter into the slice header;
setting a value indicating that a first abs_diff_view_idx_minus1 parameter corresponds to a value to be added to a prediction value of the inter-view reference index, to a first modification_of_pic_nums_idc parameter;
writing the first modification_of_pic_nums_idc parameter into the slice header;
setting 0 to the first abs_diff_view_idx_minus1 parameter;
writing the first abs_diff_view_idx_minus1 parameter into the slice header;
setting a value indicating that the modification of the first reference picture list is completed, to a second modification_of_pic_nums_idc parameter; and
writing the second modification_of_pic_nums_idc parameter into the slice header.

2. The coding method according to claim 1, further comprising
writing into a NAL unit header,
wherein said writing into a NAL unit header includes:
setting a value indicating that the current slice is included in an anchor picture, to an anchor_pic_flag parameter; and
writing the anchor_pic_flag parameter into the NAL unit header.

3. The coding method according to claim 1,
wherein said writing of a first reference list modification syntax further includes:
determining whether or not a slice type of the current slice is a B-slice; and
writing a second reference list modification syntax into the slice header when the slice type of the current slice is the B-slice, the second reference list modification syntax being a syntax for modifying a second reference picture list so that an inter-view reference picture is placed at the beginning of the second reference picture list, and the second reference picture list being different from the first reference picture list.

4. The coding method according to claim 1,
wherein said writing of a first reference list modification syntax includes
writing the ref_pic_list_modification_flag_l0 parameter, the first modification_of_pic_nums_idc parameter, and the first abs_diff_view_idx_minus1 into the slice header in consecutive order.

5. The coding method according to claim 3,
wherein said writing of a second reference list modification syntax includes:
setting a value indicating that the second reference picture list is modified, to a ref_pic_list_modification_flag_l1 parameter;
writing the ref_pic_list_modification_flag_l1 parameter into the slice header;
setting a value indicating that a second abs_diff_view_idx_minus1 parameter corresponds to a value to be added to a prediction value of the inter-view reference index, to a third modification_of_pic_nums_idc parameter;
writing the third modification_of_pic_nums_idc parameter into the slice header;
setting 0 to the second abs_diff_view_idx_minus1 parameter;
writing the second abs_diff_view_idx_minus1 parameter into the slice header;
setting a value indicating that the modification of the second reference picture list is completed, to a fourth modification_of_pic_nums_idc parameter; and
writing the fourth modification_of_pic_nums_idc parameter into the slice header.

6. The coding method according to claim 5,
wherein said writing of a second reference list modification syntax includes writing the ref_pic_list_modification_flag_l1 parameter, the third modification_of_pic_nums_idc parameter, and the second abs_diff_view_idx_minus1 parameter into the slice header in consecutive order.

7. The coding method according to claim 1,
wherein the random accessible picture is an anchor picture.

8. A decoding method of decoding a random accessible picture coded using inter-view reference, said decoding method comprising:
parsing a slice header of the random accessible picture to determine whether or not an order of one or more reference pictures included in a reference picture list has been modified so that an inter-view reference picture is placed at the beginning of the reference picture list, the one or more reference pictures being able to be referred to by the random accessible picture;
generating a prediction image in accordance with a predetermined standard when it is determined in said parsing that the order of one or more reference pictures included in the reference picture list has been modified, and generating a prediction image according to a method different from the predetermined standard when it is determined in said parsing that the order of one or more reference pictures included in the reference picture list has not been modified;
decoding a current slice included in the random accessible picture, based on the prediction image;
setting, to a detected_error_flag parameter, a value indicating that no error has occurred in the random accessible picture;
reading, from a slice header of the random accessible picture, at least one parameter included in a modification syntax, and determining whether or not an error has occurred in the read parameter, the modification syntax being a syntax for modifying a reference picture list so that an inter-view reference picture is placed at the beginning of the reference picture list; and
setting, to the detected_error_flag parameter, a value indicating that the error has occurred in the random accessible picture when it is determined that the error has occurred,
wherein at least one of determination processes is performed in said determining, the determination processes including:
(i) a first determination process of reading a ref_pic_list_modification_flag_l0 parameter from the slice header as the read parameter, determining whether or not the read ref_pic_list_modification_flag_l0 parameter is a value indicating that the reference picture list is modified, and determining that the error has occurred when the ref_pic_list_modification_flag_l0 parameter does not indicate the value indicating that the reference picture list is modified;
(ii) a second determination process of reading a modification_of_pic_nums_idc parameter from the slice header as the read parameter, determining whether or not the read modification_of_pic_nums_idc parameter is a value indicating that an abs_diff_view_idx_minus1 parameter corresponds to a value to be added to a prediction value of an inter-view reference index, and determining that the error has occurred when the read modification_of_pic_nums_idc parameter does not indicate the value indicating that the abs_diff_view_idx_minus1 parameter corresponds to the value to be added to the prediction value of the inter-view reference index; and
(iii) a third determination process of reading the abs_diff_view_idx_minus1 parameter from the slice header as the read parameter, determining whether or not the read abs_diff_view_idx_minus1 parameter is 0, and determining that the error has occurred when the abs_diff_view_idx_minus1 parameter does not indicate 0.

9. The decoding method according to claim 8,
wherein said parsing includes determining whether or not the ref_pic_list_modification_flag_l0 is a value indicating that the reference picture list has been modified.

10. The decoding method according to claim 9,
wherein, when the ref_pic_list_modification_flag_l0 is a value indicating that the reference picture list has been modified, said generating includes:
(i) reading a modification syntax for modifying the reference picture list from the slice header;
(ii) placing the inter-view reference picture at the beginning of the reference picture list; and
(iii) generating the prediction image through motion prediction using the reference picture list.

11. The decoding method according to claim 9,
wherein when the ref_pic_list_modification_flag_l0 is not a value indicating that the reference picture list has been modified, said generating includes generating the prediction image using an image of a base view as a reference image without reference to a reference index.

12. A coding apparatus that codes a random accessible picture using inter-view reference, said coding apparatus comprising:
a processor;
a non-transitory memory having stored thereon executable instructions, which when executed by the processor, cause said coding apparatus to perform:
writing, into a slice header of the random accessible picture, a modification syntax for modifying an order of one or more reference pictures included in a reference picture list, the one or more reference pictures being able to be referred to by the random accessible picture;
placing an inter-view reference picture among the one or more reference pictures at the beginning of the reference picture list; and
coding a current slice included in the random accessible picture, using the inter-view reference picture placed at the beginning of the reference picture list,
wherein said writing of a modification syntax includes:
setting a value indicating that the reference picture list is modified, to a ref_pic_list_modification_flag_l0 parameter;
writing the ref_pic_list_modification_flag_l0 parameter into the slice header;
setting a value indicating that an abs_diff_view_idx_minus1 parameter corresponds to a value to be added to a prediction value of the inter-view reference index, to a first modification_of_pic_nums_idc parameter;
writing the first modification_of_pic_nums_idc parameter into the slice header;
setting 0 to the abs_diff_view_idx_minus1 parameter;
writing the abs_diff_view_idx_minus1 parameter into the slice header;
setting a value indicating that the modification of the reference picture list is completed, to a second modification_of_pic_nums_idc parameter; and
writing the second modification_of_pic_nums_idc parameter into the slice header.

13. A decoding apparatus that decodes a random accessible picture coded using inter-view reference, said decoding apparatus comprising:

a processor;

a non-transitory memory having stored thereon executable instructions, which when executed by the processor, cause said decoding apparatus to perform:

parsing a slice header of the random accessible picture to determine whether or not an order of one or more reference pictures included in a reference picture list has been modified so that an inter-view reference picture is placed at the beginning of the reference picture list, the one or more reference pictures being able to be referred to by the random accessible picture;

generating a prediction image in accordance with a predetermined standard when said parsing determines that the order of one or more reference pictures included in the reference picture list has been modified, and generating a prediction image according to a method different from the predetermined standard when said parsing determines that the order of one or more reference pictures included in the reference picture list has not been modified;

decoding a current slice included in the random accessible picture, based on the prediction image;

setting, to a detected_error_flag parameter, a value indicating that no error has occurred in the random accessible picture; and reading, from a slice header of the random accessible picture, at least one parameter included in a modification syntax, and determining whether or not an error has occurred in the read parameter, the modification syntax being a syntax for modifying a reference picture list so that an inter-view reference picture is placed at the beginning of the reference picture list, wherein said setting sets, to the detected_error_flag parameter, a value indicating that the error has occurred in the random accessible picture when said determining determines that the error has occurred, and wherein said determining performs at least one of determination processes including:

(i) a first determination process of reading a ref_pic_list_modification_flag_l0 parameter from the slice header as the read parameter, determining whether or not the read ref_pic_list_modification_flag_l0 parameter is a value indicating that the reference picture list is modified, and determining that the error has occurred when the ref_pic_list_modification_flag_l0 parameter does not indicate the value indicating that the reference picture list is modified;

(ii) a second determination process of reading a modification_of_pic_nums_idc parameter from the slice header as the read parameter, determining whether or not the read modification_of_pic_nums_idc parameter is a value indicating that an abs_diff_view_idx_minus1 parameter corresponds to a value to be added to a prediction value of an inter-view reference index, and determining that the error has occurred when the read modification_of_pic_nums_idc parameter does not indicate the value indicating that the abs_diff_view_idx_minus1 parameter corresponds to the value to be added to the prediction value of the inter-view reference index; and (iii) a third determination process of reading the abs_diff_view_idx_minus1 parameter from the slice header as the read parameter, determining whether or not the read abs_diff_view_idx_minus1 parameter is 0, and determining that the error has occurred when the abs_diff_view_idx_minus1 parameter does not indicate 0.

* * * * *